US011455317B2

US011455317B2

(12) United States Patent
Smart

(10) Patent No.: US 11,455,317 B2
(45) Date of Patent: *Sep. 27, 2022

(54) APPLICATION PROGRAMMING INTERFACE AND HYPERGRAPH TRANSFER PROTOCOL SUPPORTING A GLOBAL HYPERGRAPH APPROACH TO REDUCING COMPLEXITY FOR ACCELERATED MULTI-DISCIPLINARY SCIENTIFIC DISCOVERY

(71) Applicant: Georgetown University, Washington, DC (US)

(72) Inventor: J. Cory Smart, Clarksville, MD (US)

(73) Assignee: Georgetown University, Washington, DC (US)

( * ) Notice: Subject to any disclaimer, the term of this patent is extended or adjusted under 35 U.S.C. 154(b) by 303 days.

This patent is subject to a terminal disclaimer.

(21) Appl. No.: 16/916,352

(22) Filed: Jun. 30, 2020

(65) Prior Publication Data
US 2020/0387521 A1    Dec. 10, 2020

Related U.S. Application Data

(63) Continuation of application No. 15/614,131, filed on Jun. 5, 2017, now Pat. No. 10,740,348.
(Continued)

(51) Int. Cl.
*G06F 16/26* (2019.01)
*G06F 16/36* (2019.01)
(Continued)

(52) U.S. Cl.
CPC .......... *G06F 16/26* (2019.01); *G06F 16/2264* (2019.01); *G06F 16/367* (2019.01);
(Continued)

(58) Field of Classification Search
CPC ............ G06F 16/2246; G06F 16/2264; G06F 16/2237; G06F 16/26; G06F 16/36;
(Continued)

(56) References Cited

U.S. PATENT DOCUMENTS 5,752,017 A    5/1998   Bhargava et al.
5,809,499 A *  9/1998   Wong .................. G06F 16/2465
                                                  706/45
(Continued)

FOREIGN PATENT DOCUMENTS

WO    WO 2010/120529 A2    10/2010
WO    WO 2010/120529 A3    10/2010

OTHER PUBLICATIONS

S. Adali. K. S. Candan, Y. Papakonstantinou, and V. S. Subrahmanian, "Query Caching and Optimiziation in Distributed Mediator Systems," Proc. 1996 ACM SIGMOD Conf. on Management of Data, Montreal, Canada, Jun. 1996.
(Continued)

*Primary Examiner* — Shahid A Alam
(74) *Attorney, Agent, or Firm* — Dawn-Marie Bey; Bey & Cotropia PLLC

(57) ABSTRACT

A system and method for connecting one or more client applications with one or more knowledge representation servers and communicating there between includes an application programming interface (API) and a hypergraph transfer protocol (HGTP), for facilitating communication between the one or more client applications and one or more knowledge representation servers responsive to a client application request. The client application request includes an API call for a specific entity that is received by a first knowledge representation server. If the first knowledge representation server does not manage the specific entity, the first knowledge representation server forwards the specific entity call to a second knowledge representation server via
(Continued)

the HGTP using a universal unique identifier (UUID) associated with the specific entity having encoded therein a network address for the second knowledge representation server.

20 Claims, 30 Drawing Sheets

Related U.S. Application Data

(60) Provisional application No. 62/345,914, filed on Jun. 6, 2016.

(51) Int. Cl.
  *G06F 16/22*       (2019.01)
  *G06N 5/02*        (2006.01)
  *H04L 12/46*       (2006.01)
  *H04L 12/00*       (2006.01)

(52) U.S. Cl.
  CPC ............... *G06N 5/02* (2013.01); *H04L 12/00* (2013.01); *H04L 12/4625* (2013.01); *G06N 5/022* (2013.01)

(58) Field of Classification Search
  CPC ....... G06F 16/367; G06F 16/22; H04L 12/00; H04L 12/4625; G06N 5/02; G06N 99/005; G06Q 10/06
  USPC ......................................................... 707/743
  See application file for complete search history.

(56) References Cited

U.S. PATENT DOCUMENTS

| | | | |
|---|---|---|---|
| 6,108,787 A | 8/2000 | Anderson et al. | |
| 6,330,554 B1* | 12/2001 | Altschuler | G06Q 30/02 706/21 |
| 6,850,252 B1 | 2/2005 | Hoffberg | |
| 6,988,093 B2 | 1/2006 | Pic et al. | |
| 7,603,344 B2 | 10/2009 | Bousquet et al. | |
| 7,649,452 B2 | 1/2010 | Zilberstein et al. | |
| 8,250,235 B2 | 8/2012 | Harvey et al. | |
| 8,479,136 B2* | 7/2013 | Hopkins | G06F 30/36 716/122 |
| 2002/0112181 A1 | 8/2002 | Smith | |
| 2003/0174723 A1 | 9/2003 | DeHon et al. | |
| 2004/0111639 A1 | 6/2004 | Schwartz et al. | |
| 2004/0133536 A1 | 7/2004 | Uceda-Sosa | |
| 2005/0108526 A1 | 5/2005 | Robertson | |
| 2005/0203892 A1 | 9/2005 | Wesley et al. | |
| 2007/0105627 A1 | 5/2007 | Campbell | |
| 2007/0182983 A1 | 8/2007 | Wyatt et al. | |
| 2008/0072290 A1 | 3/2008 | Metzer et al. | |
| 2008/0263130 A1 | 10/2008 | Michalowitz et al. | |
| 2009/0055934 A1 | 2/2009 | Jauer | |
| 2009/0254572 A1 | 10/2009 | Redlich et al. | |
| 2009/0300002 A1 | 12/2009 | Thomas et al. | |
| 2010/0049687 A1 | 2/2010 | Patten et al. | |
| 2010/0287158 A1 | 11/2010 | Toledano et al. | |
| 2010/0290476 A1 | 11/2010 | Brindle et al. | |
| 2010/0318655 A1 | 12/2010 | Kajiya | |
| 2011/0167110 A1 | 7/2011 | Hoffberg | |
| 2011/0295854 A1 | 12/2011 | Chiticariu et al. | |
| 2012/0131189 A1 | 5/2012 | Smart et al. | |
| 2012/0131530 A1 | 5/2012 | Moffitt et al. | |
| 2012/0203640 A1* | 8/2012 | Karmarkar | G06F 1/1686 705/14.66 |
| 2012/0323729 A1* | 12/2012 | Kline | G06Q 10/0833 705/26.8 |
| 2012/0330959 A1 | 12/2012 | Kretz et al. | |
| 2013/0111434 A1 | 5/2013 | Kajiya | |
| 2013/0158975 A1 | 6/2013 | Hwang et al. | |
| 2013/0212131 A1 | 8/2013 | Reddy | |
| 2014/0122228 A1 | 5/2014 | Wical | |
| 2016/0321377 A1* | 11/2016 | Noble | G06F 16/9024 |

OTHER PUBLICATIONS

T. Berners-Lee, J. Hendler, O. Lassila, "The Semantic Web," Scientific American, May 2001.

M. Broecheler, A. Pugliese, and V. S. Subrahmanian, "'DOGMA: A Disk-Oriented Graph Matching Algorithm for RDF Databases," Proc. 2009 International Semantic Web Conference, Washington, DC, Oct. 2009.

M. Broecheler, A. Pugliese, and V. S. Subrahmanian, "COSI: Cloud Oriented Subgraph Identification in Massive Social Networks," Proc. 2010 Intl. Conf. on Advances in Social Networks and Mining (ASONAM-2010), Aug. 2010, Odense, Denmark, pp. 248-255.

M. Broecheler, A. Pugliese, and V. S. Subrahmanian, "A Budget-Based Algorithm for Efficient Subgraph Matching on Huge Networks," Proce. 2011 International Conference on Graph Data Management, Hanover, Germany, Apr. 2011, pp. 94-99.

P. Caravelli, Y. Wei, D. Subak, L. Singh, J. Mann, "Understanding Evolving Group Structures in Time-Varying Networks," ASONAM '13, Proceedings of the 2013 IEEE/ACM International Conference on Advances in Social Network Analysis and Mining, pp. 142-148.

R. W. R. Darling and J. R. Norris, "Structure of Large Random Hypergraphs," the Annals of Applied Probability, vol. 15, No. 1A, 2005, pp. 125-152.

D. Dimitrov, L. Singh, J. Mann, "A Process-Centric Data Mining and Visual Analytic Tool for Exploring Complex Social Networks," IDEA '13, Aug. 11, 2013, Chicago, IL. USA.

D. Dimitrov, et al., "Comparison Queries for Uncertain Graphs," Databases and Expert Systems Applications, Lecture Notes in Computer Science, vol. 80-56, pp. 124-140, 2013.

A. Pugliese, M. Broecheler, V. S. Subrahmanian, and M. Ovelgonne, "Efficient Multi-View Maintenance Under Insertion in Huge Social Networks," ACM Transactions on the Web, vol. 8, Nr. 2, paper 10 (2014).

J. C. Smart, "The FOUR-Color Framework—A Reference Architecture for Extreme-Scale Information Sharing and Analysis," Department of Computer Science, Georgetown University, Oct. 2014, http://avesterra.georgetown.edu/tech/4cf.pdf.

J. C. Smart, "Privacy Assurance," International Engagement on Cyber, Georgetown Journal of International Affairs, 2011, http://avesterra.georgetown.edu/tech/privacy_assurance.pdf.

J. C. Smart, "Rapid Information Overlay Technology (RIOT)—A Unifying Approach, for Large Scale Analytics," Intelligence and Information Systems, Raytheon Company, Jul. 2010.

J. C. Smart, "Dependency Visualization for Complex System Understanding," Ph.D. Thesis, University of California, Davis, Sep. 1994.

Notification of Transmittal of the International Search Report and the Written Opinion of the International Searching Authority, dated Sep. 3, 2015, for PCT Application No. PCT/US15/33111, 1 p.

International Search Report for PCT Application No. PCT/US15/33111, dated Sep. 3, 2015, 2 pp.

Written Opinion of the International Searching Authority, dated Sep. 3, 2015, for PCT Application No. PCT/US15/33111, 6 pp.

Darlene Storm, "Security is Sexy—Ray theon RIOT Software Tracks People, Predicts Future Behavior," Computerworld, Feb. 11, 2013.

Rosenzweig, Paul S., "Proposals for Implementing the Terrorism Information Awareness System," 2 Geo. J. L. & Pub. Pol'y 169, 2004 (Copyright HeinOnline 2004).

Notification Concerning Transmittal of International Preliminary Report on Patentability (Chapter 1 of the Patent Cooperation Treaty), dated Jun. 6, 2013, PCT/US2011/060332, 1 page.

International Preliminary Report on Patentability, dated May 28, 2013, PCT/US2011/060332, 1 page.

Written Opinion of the International Searching Authority, PCT/US2011/060332, dated Feb. 2, 2012, 4 pages.

DaRosa, Mary, "Data Mining and Data Analysis for Counterterrorism," CSIS Press, Mar. 2004.

(56) References Cited

OTHER PUBLICATIONS

Notification of Transmittal of the International Search Report, dated Feb. 2, 2012, PCT/US2011/060332.
The International Search Report, dated Feb. 2, 2012, PCT/US2011/060332.
Written Opinion of the International Searching Authority, dated Feb. 2, 2012, PCT/US2011/060332.
Oracle, Cooperative Server Technology for Transparent Data Sharing, Oracle 7™ Serve SQL Language Reference Manual, Aug. 1993, Part No. A12714-1, pp. 4-288-4-303.
Unidirecttonal Network from Wikipedia [online], Last Updated Jan. 19, 2016 [retrieved on May 31, 2016], 7 pp., Retrieved from the Internet: en.wikipedia.org/wiki/Unidirectional_network.
Douglas W. Jones, Tom C. Bowersox, "Secure Data Export and Auditing Using Data Diodes," Department of Computer Science, The University of Iowa, pp. 1-5, 2006.
Myong H. Kang, Ira S. Moskowitz, Stanley Chincheck, "The Pump: A Decade of Covert Fun," Center for High Assurance Computer Systems, Naval Research Laboratory, 21$^{st}$ Annual Computer Security Applications Conference, 2005, pp. 1-7.
Multilevel Security, from Wikipedia [online], Last Updated May 31, 2016 [retrieved on May 31, 2016], 11 pp., Retrieved from the Internet: en.wikipedia.org/wiki/Multilevel_security.
"The Common Gateway Interface" [online], [retrieved on Apr. 26, 2017], 1 p., Retrieved From the Internet: httg://web.archive.org/web/20100127161358/http://hoohoo.ncsa.illinois.edu/cgi/.
"RFC 4122—A Universally Unique Identifier (UUID) URN Namespace" [online], Jul. 2005 [retrieved on Apr. 26, 2017], 33 pp., Retrieved From the Internet: http://tools.ieft.org/html/rfc4122.
"HTTP—Hypertext Transfer Protocol Overview" [online], Copyright 1996-2003 [retrieved on Apr. 26, 2017], 6 pp., Retrieved From the Internet: http://www.w3.org/Protocols/.
F. Hirsch, R. Philpott, and E. Maler, Eds., "Security and Privacy Considerations for the OASIS Security Assertion Markup Language (SAML) V2.0," OASIS, Mar. 15, 2005, 33 pp.
Susan Martin, Ph.D., et al., "Forecasting the Break: Building Community and Capacity for Large-Scale, Data-Intensive Research in Forced Migration Studies," A Prosposal to the National Science Foundation, Feb. 2013, 20 pp.
M. A. Thornton and F. R. Chang, "Security Property Checking for Information Processing Circuitry," Georgetown University and Southern Methodist University, 5 pp., Feb. 28, 2014.
"Rapid Information Overlay Technology (RIOT)—A Unifying Approach for Large-Scale Analytics," Raytheon, 15 pp., Oct. 1, 2011.
J. C. Smart, et al., "Privacy Assurance (a.k.a. The "Black Box")—A High-Assurance Method for Sharing and Analysis of Private Information," Georgetown University, et al., 67 pp., Jan. 29, 2014.

\* cited by examiner

APPLICATION PROGRAMMING INTERFACE AND HYPERGRAPH TRANSFER PROTOCOL SUPPORTING A GLOBAL HYPERGRAPH APPROACH TO REDUCING COMPLEXITY FOR ACCELERATED MULTI-DISCIPLINARY SCIENTIFIC DISCOVERY

CROSS-REFERENCE TO RELATED APPLICATIONS

The present application is a continuation of U.S. application Ser. No. 15/614,131, entitled "APPLICATION PROGRAMMING INTERFACE AND HYPERGRAPH TRANSFER PROTOCOL SUPPORTING A GLOBAL HYPERGRAPH APPROACH TO REDUCING COMPLEXITY FOR ACCELERATED MULTI-DISCIPLINARY SCIENTIFIC DISCOVERY," which was filed on Jun. 5, 2017, which claims benefit of priority to U.S. Provisional Patent Application No. 62/345,914 entitled APPLICATION PROGRAMMING INTERFACE AND HYPERGRAPH TRANSFER PROTOCOL SUPPORTING A GLOBAL HYPERGRAPH APPROACH TO REDUCING COMPLEXITY FOR ACCELERATED MULTI-DISCIPLINARY SCIENTIFIC DISCOVERY which was filed on Jun. 6, 2016.

The following applications, the contents of which are incorporated herein by reference in their entireties, are cross-referenced hereby: U.S. utility patent application Ser. No. 14/724,921 entitled "A Process and Framework For Facilitating Data Sharing Using a Distributed Hypergraph," filed May 29, 2015; U.S. Provisional Patent Application Ser. No. 62/005,385 entitled "Architecture for Extreme-Scale Information Sharing and Analysis" filed on May 30, 2014; and U.S. Provisional Patent Application Ser. No. 61/114,883 entitled "Global Hypergraph Approach to Reducing Complexity for Accelerated Multi-Disciplinary Scientific Discovery" filed on Feb. 11, 2015 (hereafter "Cross-Referenced Applications").

GOVERNMENT LICENSE RIGHTS

The government of the United States of America may retain a non-exclusive irrevocable, royalty-free license in one or more embodiments herein pursuant to Defense Advanced Research Projects Agency (DARPA), Contract No. N6601-15-C-4044.

COMPUTER PROGRAM LISTING APPENDIX

A reference specification defining an API in accordance with the exemplary embodiment described herein is attached as Appendix A and is incorporated herein by reference in its entirety.

BACKGROUND OF THE EMBODIMENTS

Our world is a complex place. It is faced with many difficult, interdependent problems; some caused by nature, others caused by man. As individuals, families, communities, and nations, we face an ever changing and compounding series of perplexing challenges spanning numerous domains: defense, health, climate, food, cyber, energy, transportation, education, weather, the economy. Compounding pressures in each of these areas threaten our health, our safety, our security, our livelihood, and our sustainability. We seek improved capabilities to detect, understand, mitigate, and prevent our brave new world of threats. To address these challenges, we invariably resort to science, our systematic enterprise for building and organizing knowledge that helps us understand, explain, and predict our world around us. At the core of science is inquiry. We formulate questions. We generate hypotheses. We predict consequences. We experiment. We analyze. We evaluate. We repeat. Our problems are complex; the process is slow.

Fueling the scientific process are the observations we make and the data we collect. With the advent of the 21st century telecommunications explosion, data is now flowing and evolving all around us in massive volumes, with countless new streams, mixing and shifting each minute. This data space is enormous and continuously changing. And by many accounts, its expansion and movement has only just begun. Analyzing and understanding this vast new ocean of data is now of paramount importance to addressing many of the complex challenges facing our world.

Today's data analytic industry is vibrant with a continuous supply of new and innovative products, services, and techniques that thrive and prosper based on their relative merits in the respective marketplaces. Unfortunately, these components are rarely interoperable at any appreciable scale. Moreover, the rapid proliferation of analytic tools has further compounded the problem. With only loose coordination, these partial solutions are ineffective at combating the broad spectrum of problems. Attempting to impose a "one-size-fits-all" analytic solution, however, across today's tremendous data expanse poses significant scientific, technical, social, political, and economic concerns. Consequently, an enormous amount of resources must regularly be expended to address isolated issues and mitigate specific threats. Thus, the analytic community faces considerable challenges dealing with major classes of problems-particularly those at national and international levels.

The present embodiments describe an approach for organizing and analyzing our new data-centric world, rapidly sharing information derived from that data, unifying this information into a common global knowledge framework, and enabling scientific analysis at a scale never before possible. The approach is a transformative, multi-disciplinary approach to collaborative global-scale integrative research. This approach offers a new method for dramatically reducing complexity and accelerating the scientific discovery process. This approach was specifically formulated to address extremely complex problems related to global security, world health, and planet sustainability. The approach advocates the construction of a unified global systems model. At the core of its design is an extensible knowledge representation architecture specifically crafted for large-scale, high-performance, real-time scientific analysis of heterogeneous, dynamic and widely distributed data sources without compromise of data security, safety, or privacy.

The approach employs a powerful integration of advanced concepts and emerging capabilities selected from across the government, commercial, laboratory, and academic sectors. The resulting framework offers participants a pragmatic means to think globally, leveraging the aggregate of combined knowledge to further science, and better inform local, regional and international decision making. This approach exploits the uniqueness of heterogeneous data sources and diverse scientific theories, weaving all such points together into a powerful collaborative fabric. Great care, however, must be taken with this stitching process. The movement and replication of data is costly and risks inappropriate information disclosure and/or compromise. The farther data flows from its source, and the more information that is aggregated by an increasing number of parties, the greater the security and privacy concerns and accompanying loss of autonomy. As described herein, the approach addresses these concerns in its foundational design tenets.

A primary goal of this approach is to achieve a computational science analog to self-sustained nuclear fission. That is, the approach advocates a method for reaching a critical knowledge (mass) density that is capable of sustaining an unprecedented analytic (energy) yield. To achieve such high levels, the approach grapples with scale right from the onset, encouraging knowledge enrichment "downward" in addition to traditional data pipeline scaling "upward". To this end, the approach includes the construction of a knowledge representation structure that spans the planet and numerous of its complex, interdependent subsystems. The construction of this structure is accomplished via carefully formulated transformations of the world's exponentially increasing data into an asymptotically limited information space. This technique enables global-scale computational tractability, promising a reduction in integration time and cost from quadratic down to linear in the number of source data systems. Thus, the analytic framework offered provides a practical, achievable means for accomplishing multi-disciplinary research across many diverse, complex and often heavily interdependent domains. The results of this work offer a conceptually simple yet elegant method for the scientific community to manage complexity across many heterogeneous domains at a scale never before possible.

SUMMARY OF THE EMBODIMENTS

In a first exemplary embodiment, a system for connecting one or more client applications with one or more knowledge representation servers is described. The system includes an application programming interface (API) and a hypergraph transfer protocol (HGTP), for facilitating communication between the one or more client applications and one or more knowledge representation servers responsive to a client application request, wherein the client application request includes an API call for a specific entity that is received by a first knowledge representation server that does not manage the specific entity, the first knowledge representation server forwarding the specific entity call to a second knowledge representation server via the HGTP.

In a second exemplary embodiment, a process for facilitating a query within a pre-determined knowledge space comprised of multiple distributed knowledge representation servers is described. The process includes: issuing a client application request related to a specific entity associated with the pre-determined knowledge space from a first client application associated with a first distributed knowledge representation server via an application programming interface (API); determining at the first distributed knowledge representation server that the specific entity is managed at a second distributed knowledge representation server; forwarding the client application request related to the specific entity to the second distributed knowledge representation server using a hypergraph transfer protocol (HGTP); and receiving from the distributed knowledge representation server second distributed knowledge representation server using a hypergraph transfer protocol (HGTP) at the first distributed knowledge representation server, a message responsive to the client application request.

In a third exemplary embodiment, a process for dynamically building and maintaining a dynamic knowledge space comprised of multiple entities existing across multiple distributed knowledge representation servers and accessible by multiple clients, includes: providing each of the multiple distributed knowledge representation servers and each of the multiple clients with a set of common operations to be performed on data located thereon; adding an entity to the dynamic knowledge space by any one of the multiple distributed knowledge representation servers and multiple clients using a create operator from the set of common operations, wherein the create operator allocates and records a universal unique identifier (UUID) for the added entity; and invoking a method associated with the added entity using an invoke operator from the set of common operations, wherein a first of the multiple distributed knowledge representation servers receiving the invoke request for the added entity uses the invoke operator to determine if the added entity is local by examining the added entity's UUID, upon determining that the added entity is local to the first of the multiple distributed knowledge representation servers, fulfilling the invoke request, upon determining that the added entity is not local to the first of the multiple distributed knowledge representation servers, forwarding the invoke request to a second of the multiple distributed knowledge representation servers in accordance with location information encoded in the added entity's UUID.

SUMMARY OF THE FIGURES

The following figures are intended to be considered in conjunction with the written specification below to support a detailed description of the embodiments and claims.

DETAILED DESCRIPTION

Figure 1A:
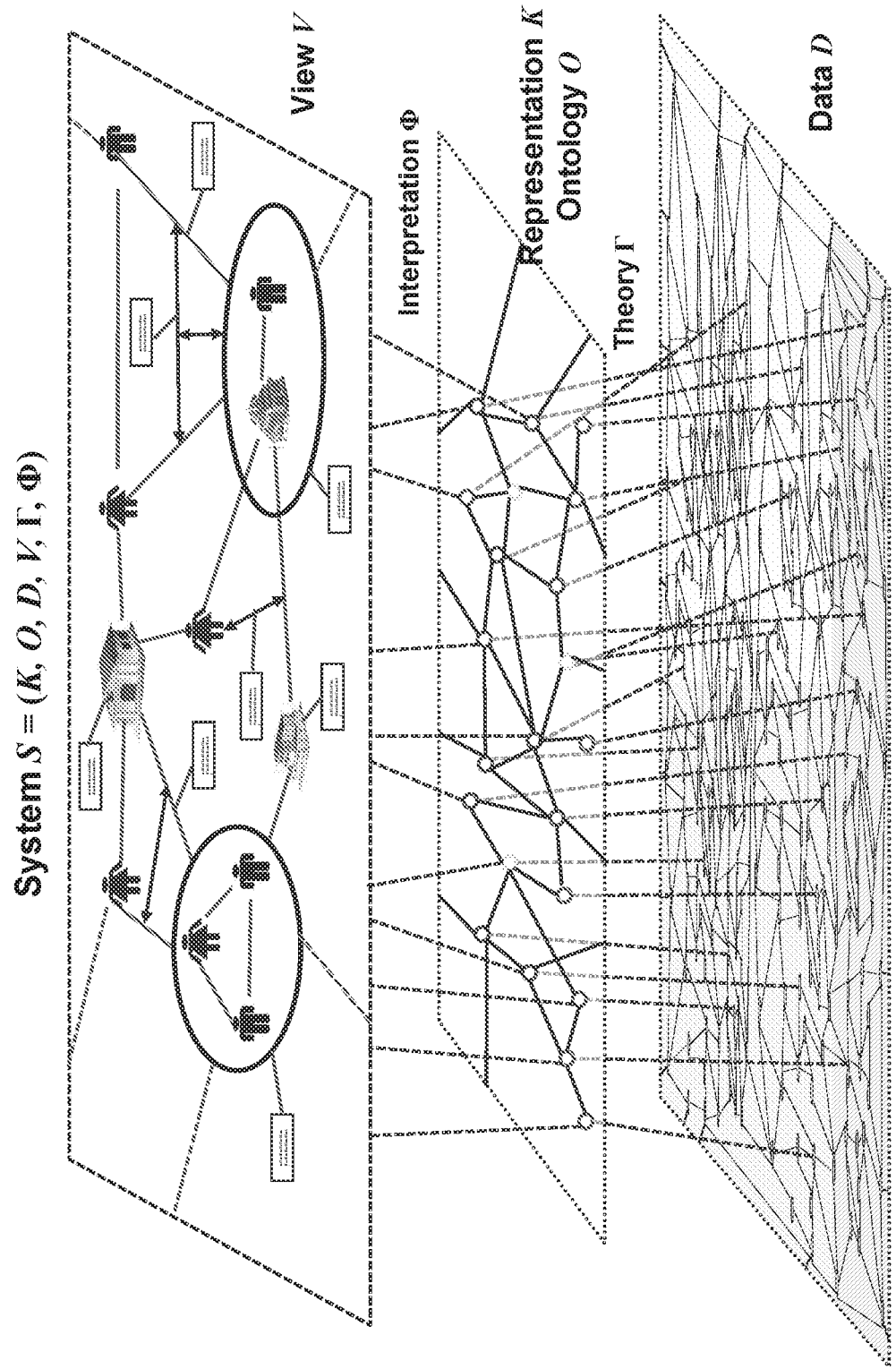
FIG. 1(A) is a schematic of a distributed system in accordance with a preferred embodiment.

The embodiments described herein are directed to an Application Programming Interface (API) and a Hypergraph Transfer Protocol (HGTP) for providing system component inter-connectivity and communication instructions to the framework described in the embodiments of the Cross-Referenced Applications and for facilitating the solutions, processes and functionality described therein.

As described in more detail in the Cross-Reference Applications, the embodiments discussed herein facilitate system component inter-connectivity and communication between components of an innovative system and method for constructing a knowledge model "overlay" for organizing and analyzing large, dynamic data volumes (e.g. the World-Wide Web). This overlay is implemented as a hypergraph that manifests as a result of a distributed theory-driven data source transformation process. This process maps exponentially growing data into an asymptotically limited information space. Within this space, real-world entities (e.g. people, computers, cities, Earth) and their complex interdependencies (e.g. social networks, connectivity, causal relationships) are represented as attributed hypergraph elements (i.e. both hypervertices and hyperedges). Attributes are represented as state vectors affixed to any hypergraph element. Transformation of source system data into this overlay structure is accomplished with minimal data movement and replication. Rather, the overlay structure is populated using a universal "pointer" like mechanism that is managed in a decentralized fashion by the respective transformation components. Access to the knowledge overlay is performed via the hypergraph communication protocol (HGTP) which is the subject of one of the embodiments described herein. This protocol was specifically designed with formal mathematical verification in mind to enable extremely robust security and "black box" privacy isolation techniques. This protocol is encapsulated within the hypergraph API which is also described below.

The solution supports both qualitative and quantitative knowledge, but makes a distinction between knowledge that characterizes the temporal state of a system versus that which defines the dynamics of its state changes. The former is represented within the knowledge hypergraph structure, while the latter is embodied within the surrounding analytic components that produce and consume this structure. The solution was specifically formulated to accommodate an enormous diversity of data. The scheme discourages data movement beyond the boundaries of its system of origin. To achieve this objective, source data is fundamentally treated as scientific observations or measurements of some set of interdependent subsystems (e.g. an individual, cyberspace, Earth). The transformation components are used to map source system data into the knowledge overlay structure, thus minimizing data replication and movement. Except when cached for performance reasons, data largely remains at rest in its origin system and in its original structure and form. This approach discourages notions of a universal data representation or universal data federation as an effective means to complexity reduction. Rather, it advocates that data be acted upon locally with transformation components that map sources into a shared knowledge model.

Modularity and scalability are at the core of the preferred solution. The development of this design was driven by pragmatic engineering constraints to ensure practical implementation and performance, given current and emerging computational resources and technology. Although domain-agnostic, the approach is directed at hypergraph representation of macroscopic entities and their relationships (e.g. people, cities, social networks, cyberspace) in contrast to the comparatively unbounded data world of microscopic structures. Microscopic-level information can, however, be affixed to hypergraph elements as attribute state vectors. In addition, the solution does allow for recursive application of itself. The solution can be applied to discrete micro-level sub-systems that in turn can be integrated into a single larger macro-level system via hierarchical application of its principles.

While domain-agnostic, the utility of this approach is highly dependent upon the existence of a unified (but extensible) ontological framework that formally defines a system's knowledge model structure. Historically, without taking careful precautions, ontology development can evolve into a horribly nightmarish resolution process. However, by constraining the knowledge model scope to real-world entities that obey an asymptotically limited discovery/growth profile (e.g. people, organizations, cellphones), this process can be dramatically simplified. The solution thus prescribes a flexible ontological process that balances entity/relationship type specification with attribute type extension. In this setting, the incorporation of multiple domains/use cases is encouraged very early on as the distillation of this balance can be accelerated considerably.

Referring generally to FIG. 1(A), a schematic for a framework for a shared global-scale knowledge space is shown. This framework provides a method for integrating evidence from many sources—including mathematical, computational, experimental, and observational—spanning multiple modalities and levels of abstraction. This framework was specifically formulated to automate the fusion of disparate data types and reasoning methods to unify understanding and eliminate a significant scientific research bottleneck. The resulting representation approach enable connection of heterogeneous forms of scientific (and other) information to greatly accelerate the research process. This approach resolves the tension between domain-specific tools that require tuning to specific problems and general-purpose abstract methods that require idealization of the data, providing a robust unified foundation upon which automated, knowledge-driven application systems can be built.

The system prescribes a distributed analytic ecosystem for examining data, communicating information, and discovering, representing, and enriching shared knowledge. The system formalism begins with the establishment of a conceptual boundary to whatever it is applied. This system may be a microscopic organism, the human body, a community, a continent, or the planet Earth.

Within a system's boundary, data is regarded as a collection of observations about this system. That is, given a complex system S, the (often unbounded) set $D=\{d_1, d_2, d_3, \ldots\}$ contains data about S where each $d_i \in D$ is viewed as a "scientific measurement" of some aspect of S. For example, an element d may be spectral decomposition of a chemical, a gene sequence of an organism, an e-mail message of an individual, the text of community's legal statute, or the seismic motion of a tectonic plate. When viewed in this manner, associated with every datum d is a measurement precision, measurement accuracy, and a frame of reference (e.g. spatial-temporal perspective) in which the measurement was made (i.e. data was collected). These items may be either explicitly stated or implicitly assumed, and may not always be imminently calculable. This treatment is important, however, so that subsequent data collection and analysis about whatever system is being studied rests on a scientific foundation.

For any given system S, prescribed next is the notion of a knowledge representation. A knowledge representation K is a model of system S, which may likely be time varying and dynamic depending upon the complexity of S. Associated with every knowledge representation K is an ontology O that formally defines the semantics of all element types of K. To aid complexity reduction, and often as a practical and computational necessity, a knowledge representation K and its accompanying ontology O generally represent a simplification of S which may purposefully ignore various characteristics of S that may be deemed irrelevant or of little consequence to the particular line of scientific inquiry.

The system provides a collaborative approach for building shared knowledge representations for systems of high complexity and large scale. These representations are derived by leveraging large, distributed, and heterogeneous data spaces. By way of example, an initial system was formulated to enable knowledge representation at extreme scale, where the complexity of the system may span a diverse range of application domains (e.g. our planet and all of its inhabitants, or a human organ and all of its cells). The system formalism may be applied recursively in a hierarchical fashion and then dovetailed, yielding an even broader ecosystem of integrated knowledge representation components that span multiple levels of abstraction.

Within a particular set of system domains, the knowledge representation K for system S is constructed through an ongoing sequence of observations (i.e. data) and the application of scientific theories (i.e. analytics) about such observations. These theories define a collection of transformation operations $\Gamma=\{\gamma_1, \gamma_2, \gamma_3, \ldots\}$ upon K. Characterized here as knowledge enrichment, these transformation operations constitute the knowledge extraction process. In essence, these extraction operations transform a system knowledge representation from one state to another, thereby formally capturing what was extracted. For example, a specific theory $\gamma_\alpha$ might define an initial state based on a particular data subset as in $$\gamma_\alpha(\emptyset, d_i, d_j, d_k, \ldots) \Rightarrow K$$

whereas another theory $\gamma_\beta$ might transform a knowledge representation's current state into a new state given new data as in $$\gamma_\beta(K, d_i, d_j, d_k, \ldots) \Rightarrow K'.$$

Other theories may transform a knowledge representation simply based on the value of its current state without involving any data observations, as in $$\gamma_\xi(K) \Rightarrow K'.$$

At an even greater level of complexity, a theory might transform a knowledge representation based on knowledge representation of other systems as in $$\gamma_\Xi(K, K_X, K_Y, \ldots) \Rightarrow K'.$$

The system embraces all of these forms of transformations/extractions and many variants.

Given a knowledge representation K for system S, it is recognized that there may exist multiple interpretations of K depending upon the specific domain. The system thus incorporates the notion of views $V=\{v_1, v_2, v_3, \ldots\}$ where each $v_i \in V$ is created via a function from the set $\Phi=\{\phi_1, \phi_2, \phi_3, \ldots\}$ that contains the various interpretations of K. Each interpretation function $\phi_i \in 0$ defines a mapping $\phi_i: K \to V$ that translates some subset of knowledge representation K into its respective view of K. This type of interpretation is again another form of knowledge extraction, but with the emphasis on enrichment of the end user(s) understanding, versus enrichment of the computer-based representation. The system imposes no particular mathematical restrictions on views or their respective interpretation functions. An interpretation of K may produce a view as simple as a range of scalar values or as complex as a multi-dimensional vector space. Alternatively, there may be a need for only one view with K=V and $\Phi$ containing only the identity mapping. The view/interpretation formalism is provided so that the same system knowledge representation may offer varying perspectives in support of a wide range of end-user applications.

The blending of these various concepts is depicted in the figure below. The bottom layer of the diagram is a representation of the vast data space D for system S. The middle layer of the diagram contains the system knowledge representation K created as a result of the theory set $\Gamma$. At the top of the FIG. 1(A) is the view space V created as a result of the interpretation set $\Phi$ that results when applied to knowledge representation K.

In summary, the embodied formalism mathematically portrays a complex system S as the 6-tuple $$S=(K, O, D, V, \Gamma, \Phi).$$

That is, the process strives to create a unified knowledge representation K with ontology O of a complex system S that explains phenomena D via theory Γ, presenting results V via interpretation Φ. The scientific method provides a mechanism for testing the validity of theory Γ and the utility of knowledge representation K through experimentation, offering an evolutionary (or revolutionary) path to new models, new theories, new interpretations, and thus ultimately new discoveries.

The formalism uses an extremely powerful form of knowledge representation based on a highly generalized mathematical graph structure. In this formalism, a knowledge representation K is defined as a 3-tuple K=(E, R, A) where E={$e_1, e_2, e_3, \ldots$} is a set of entities, R={$r_1, r_2, r_3, \ldots$} is a set of relationships between entities in E, and A={$a_1, a_2, a_3, \ldots$} is a set of attributes that are associated with elements of E and R. This supports traditional (binary) directed and undirected graph relationship structures where R⊆E×E. And it allows much richer relationship structures including hypergraphs, ultragraphs, and ubergraphs.

With the hypergraph formulation, R is generalized so that relationships may be n-ary. That is, R⊆E×E . . . ×E or R⊆ $\mathcal{P}$(E), where $\mathcal{P}$(E) is the power set of E. Ultragraphs generalize the notion of a relationship still further, allowing relationships between not only entities, but also with other relationships. Thus, R⊆$\mathcal{P}$($\mathcal{P}$( . . . $\mathcal{P}$(E))). Finally, Ubergraphs generalize this one step further, allowing the relationships to be recursive. That is, an entity e∈E may have relationships with other relationships, that have relationships with others, and so on, that ultimately may contain e itself. In simple terms, this is accommodated by allowing relationships to behave and be represented as entities themselves where E∩R need not be the empty set. Thus, at full generalization, entities and relationships mathematically become indistinguishable, and are differentiable only within the context of an accompanying ontology.

To accommodate most if not all contemporary underlying data organization, storage, and retrieval techniques including relational databases, object systems, indexing systems, graph systems, etc., the formalism includes a general attribute structure that enables collections of attributes to be affixed to any element of the knowledge representation. That is, an attribute a∈A may be affixed to any entity e∈E or r∈R. Instances of such attributes may range from a simple attribute taxonomy with accompanying scalar or aggregate values to rich sets of entities and relationships that have already been captured within the representation. With this structure, any arbitrary graph, hypergraph, ultragraph, or ubergraph representation of a system can be constructed and appropriately annotated via the formalism.

The Application Programming Interface (API) provides a computational method for creating, accessing, and managing a shared global-scale knowledge space conforming to the formalism described above. This knowledge space is realized through a spectrum of implementation alternatives that range from mobile devices and simple desktop computers, to widely distributed systems and high-performance super-computing platforms spanning the breadth of the Internet. This API provides a concise method for isolating the design and implementation of analytic applications from the diversity and complexity of this widely varying underlying computational infrastructure. This isolation enables collaborative communities to develop analytic components at a global level, but in a manner divorced from the minutia of ever-changing low-level implementation detail. The result of this separation is the production of an analytic ecosystem that is highly reusable, agile, and resilient to the continuous evolution of data and data processing techniques with the end goal of achieving unprecedented levels of knowledge density and accompanying analytic yield. The primary architectural construct for achieving these objectives is this API.

Figure 1B:
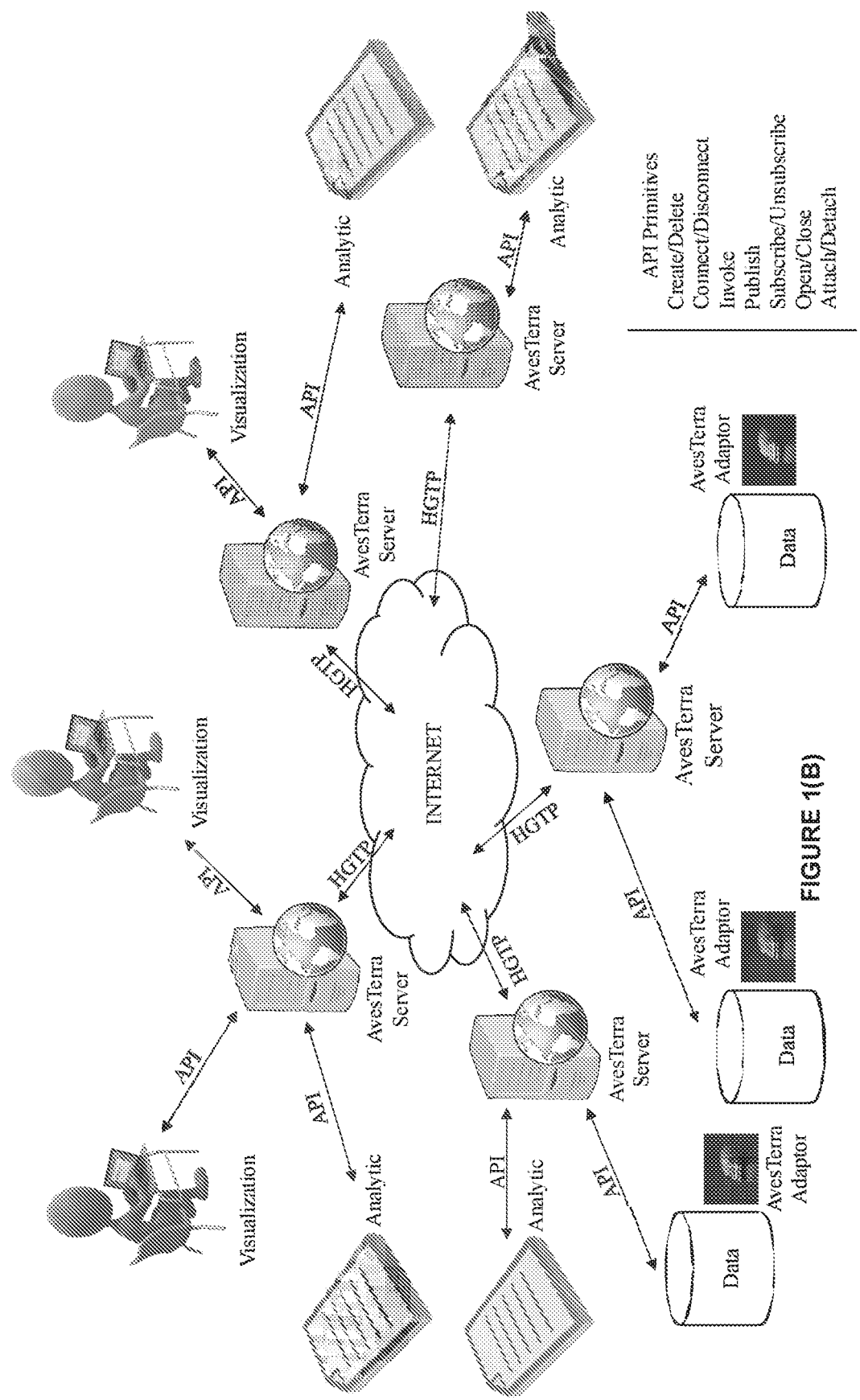
FIG. 1(B) is a schematic is a second schematic of the knowledge representation framework described herein to implement preferred embodiments.

In general, software processes use the API to communicate with a local server. Multiple servers are connected in peer-to-peer fashion. If the local server cannot directly fulfill an API request due to the referenced items being managed elsewhere, the local server forwards the request to the appropriate remote server for processing. When the remote operation is completed, any result is forwarded back to the local server so that the original API request can be fulfilled. In this manner, all requests to the knowledge space appear local, even though this space may be highly distributed across a global server enterprise. FIG. 1(B) illustrates a schematic of a distributed system in accordance with a preferred embodiment.

For the purpose of the exemplary API discussed herein, the Ada programming language, as defined by ISO/IEC 8652:2012, is used as a model specification language to formally define the API at an abstract reference level. This reference specification is provided in Appendix A. One skilled in the art recognizes that bindings to other programming languages and environments (e.g. Python, Java, C++, R, Swift) are within the scope of this description and would be considered as alternative embodiments.

Interface Operations

The API exposes a knowledge space. A knowledge space is a collection of items that represent instances of various concepts and relationships, as defined by an external ontology. These items possess attributes that characterize, relate, and differentiate them from each other, many of which may dynamically change over time. These items also possess methods that allow various actions to be performed upon them. This knowledge space is shared amongst all users of the API, imposing authorization restrictions as determined by the knowledge originators. Access to the knowledge space is provided via a set of operations involving the following primary interface constructs: Entities; Attachments; Connections; Outlets and Events.

Entities are the basic elements that form a knowledge space. Attachments are the mechanism used to affix attributes to entities via external adapters. Connections are a similar adapter mechanism used to connect external analytic functions and procedures to entities. Outlets are used for the actual interfacing of these external components. Outlets also provide a mechanism for external processes to receive asynchronous notifications using the system's event publication and subscription operations.

To access the various services, the API defines a single INITALIZE operation that is executed at the start of a session, and prior to execution of any other API operations. The INITALIZE operation allocates the appropriate resources needed for a client application to communicate with a server. The operation defines a single optional server formal parameter. A server is a special entity instance that represents an actual system server. All system servers (i.e. physical real-world software/hardware devices) have server entity representations in the knowledge space. Conceptually, API communications can be thought of as transactions with a server entity. Unlike all other entity types, however, server entities are rigidly bound to the specific real-world server they represent and cannot be dynamically changed. Thus, server entities only respond to a limited range of API operations (for example, they cannot be deleted).

Server: Optional argument specifying the default server entity with which the API will communicate. If no server is specified, the implementation typically resorts to the local server, if one is available. Example: API.Initialize(my_server).

Upon completion of a session, processes execute the FINALIZE operation to release all resources that were needed or acquired during a session. The API defines no formal parameters for this operation. Example: API.Initialize(my_server).

Excluding INITIALIZE and FINALIZE, the specification of nearly all other API operations include an optional authorization parameter. This parameter is used to convey the client application's access control privileges. The API assumes a token-based authorization approach, but does not prescribe how the authorization mechanism should be structured, leaving the details of the implementation to the developer to enable integration with a diversity of access control systems and capabilities. It is envisioned that different authorization tokens may be required depending upon, say, the type of API operations requested (e.g. CREATE/DELETE versus INVOKE/INQUIRE), the class or subclass of the entity involved, the analytic communities involved, or the specific server or compute enclave where the operation is to be performed. If no authorization argument is provided, then a default null authorization is assumed, implying the absence of any authorization criteria. The exception AUTHORIZATION_ERROR is raised if an operation fails due to insufficient authorization.

Entities

The fundamental elements of a knowledge space are entities. Entities correspond to things. These things may represent items with a real material or physical existence such as people, places, and machines, or they may represent abstractions such as processes, systems, or relationships among of other things. Relationships are knowledge space entities that link other entities together, expressing dependencies or requirements between them. Entities in a knowledge space may possess attributes that characterize and distinguish them from others (e.g. name, type, size, location) or capture relationships with others. Entities may also possess methods that define specific operations that may be performed upon them. The API provides a uniform method for creating and deleting entities in the knowledge space, affixing attributes, accessing methods, linking entities with other entities, and accessing aggregate information.

The API places no restrictions on what may be an entity. Rather, what constitutes a valid entity type is controlled by an accompanying ontology associated with the knowledge space. At the API level, the system is ontologically neutral. That is, the API imposes no single fixed ontological structure upon the entities in the knowledge space. An ontology may be rigidly fixed, or it may be real-time extendable. However, in order to prevent invalidation of existing knowledge space contents and avoid confusing, ambiguous interpretations of current entity instantiations, the system imposes the restriction that the ontology cannot be dynamically refactored in a manner that would create conflicting definitions for identical entity types. In addition, the API enforces every entity instance to be uniquely identifiable and distinguishable from all other entities. For this purpose, a universally unique identifier (UUID) is affixed to every entity instance. The specifics of how entity unique identifiers are defined are hidden from the API user and left as a language binding implementation detail.

The API defines six basic operations that can be performed upon an entity: CREATE, DELETE, INVOKE, INQUIRE, REFERENCE, DEREFERENCE. The specifications for each of these operations defines a variety of parameters, many of them optional with default values.

The CREATE operator is used to create a new entity in the knowledge space. In general, this operation allocates and records a UUID for the new entity so that it may be referenced and distinguished from all other entities in the space. Once created, the entity may be accessed via the API from any location across a system deployed enterprise with network connectivity (e.g. the Internet). Depending up the language specific binding, the API provides both a procedural and functional CREATE operator form with the following parameters:

entity: Required parameter specifying the variable to receive the created entity's identifier. In its functional form, the entity identifier is the return value of the CREATE function.

name: Optional parameter that specifies the name to be associated with the entity. Entity names need not be unique. If no name argument is provided, the null name is assumed.

class: Optional parameter that specifies the ontological class of the entity that is being created, as defined by the ontology. This value is returned as the entity's class whenever requested and cannot be changed. If no class argument is provided, the null class is assumed.

subclass: Optional parameter that specifies the ontological subclass of the entity that is being created, as defined by the ontology. This value is returned as the entity's subclass whenever requested and cannot be changed. If no subclass argument is provided, the null subclass is assumed.

persistent: Optional parameter specifying if (and possibly how) an entity is to be persisted. Non-persistent entities may be automatically deleted in accordance with a garbage collector policy or upon server re-start. If no persistent argument is provided, the null persistence is assumed. The details of how entities are persisted and the garbage collection policy are implementation defined.

authorization: Optional parameter that specifies the authorization token required for all subsequent access of this entity. If no authorization argument is provided, a null authorization is assumed, which then presumes that no access restrictions are to be associated with the entity.

Examples: Create (entity, "A. V. Terra", person, adult, true, my_authorization); entity:=Create ("Milwaukee", place, city).

The DELETE operation performs the reverse of the CREATE operation, permanently releasing an entity and ensuring that its internal UUID is never again issued. If the specified entity does not exist, an ENTITY_ERROR exception is raised.

entity: Required parameter that specifies the identifier of the entity to be deleted.

authorization: Optional parameter that specifies the authorization under which the operation may be performed. If no authorization argument is provided, a null authorization is assumed.

Example: Delete (entity, my_authorization).

The INVOKE operation is perhaps among the most heavily used of all API operations. It is purpose is to provide access to an entity's methods. Entities may have any number of methods (zero or more). An entity's methods are determined by the outlets to which the entity has been connected (see connection operations below). When a server receives a method invocation request via an API call, the server first examines the entity's identifier. If the entity is local, the server next examines the entity's connections, forwarding the invoke request to the associated outlet with the highest assigned precedence value setting equal to or less than the optional precedence parameter. If no precedence value is specified, or specified as 0, then the outlet with the highest precedence connection for the specified method is invoked. If the specified entity is not local, then the request is forwarded to the remote server where the entity is managed (i.e. where it was created). The remote server processes the request, returning a response back to the originating local server for request fulfillment and completion of the API INVOKE call. The API specifies both procedural and functional INVOKE operation forms, depending upon the language specific binding. The procedural form is used when no return value is required; the functional form is used when a single return value is expected. Attempts to invoke methods on entities that are not connected via an outlet result in an ENTITY_ERROR exception being raised.

entity: Required parameter that specifies the entity whose method is to be invoked.

method: Optional parameter that specifies the method to be invoked. Valid methods are defined by the ontology. If no method argument is provided, the null method is assumed.

attribute: Optional parameter that specifies an attribute to be associated with the method invocation request. Valid attributes are defined by the ontology. If no attribute argument is provided, the null attribute is assumed.

name: Optional parameter that specifies a name to be associated with the method invocation request. Depending upon the language specific binding, the parameter is generally a string value, the use of which is defined by the adapter(s) connected to the entity. If no name argument is provided, a null name is assumed.

value: Optional parameter that specifies a value to be associated with the method invocation request. Depending upon the language specific binding, the parameter is generally a string value, the use of which is defined by the adapter(s) connected to the entity. If no value argument is provided, a null value is assumed.

parameter: Optional parameter that specifies an additional parameter to be associated with the method invocation request. Depending upon the language specific binding, this parameter is generally a scalar value (e.g. integer), the use of which is defined by the adapter(s) connected to the entity. If no parameter argument is provided, a null parameter is assumed.

precedence: Optional parameter that specifies the precedence level to be assigned to the invocation. Precedence determines which outlet is to be passed the invocation request. Specifically, the invocation is passed to the first adapter connected at the lowest precedence value greater than or equal to this parameter. If no parameter argument is provided, a null precedence is assumed, indicating that the request is passed to the first available (lowest precedence value) outlet.

timeout: Optional parameter that specifies the maximum wait time in seconds for the invocation. A value of 0 indicates that the invocation should not return until the operation has completed. If the maximum wait time is met, the operation terminates, raising a TIMEOUT_EXCEPTION. If no timeout argument is provided, a null timeout is assumed, as defined by the language specific binding.

authorization: Optional parameter that specifies the authorization under which the operation may be performed. If no authorization argument is provided, a null authorization is assumed.

Examples: API.Invoke (id, a_method, an_attribute, "My name" , , , my_authorization); value:=Invoke (id, a_method, an_attribute, name, 0, 1, my_authorization);

The INQUIRE operation is very similar to the INVOKE operation, but formulated primarily for entity attribute retrieval. Entities may have any number of attributes (zero or more). An entity's attributes are determined by the outlets to which the entity has been attached. When a server receives an attribute inquisition request via an API call, the server first examines the entity's identifier. If the entity is local, the server next examines the entity's attachment, forwarding the inquisition request to the associated outlet with the highest assigned precedence value setting equal to or less than the optional precedence parameter. If no precedence value is specified, or specified as 0, then the outlet with the highest precedence attachment for the specified attribute is inquired. If the specified entity is not local, then the request is forwarded to the remote server where the entity is managed (e.g. where it was created). The remote server processes the request, returning a response back to the originating local server for request fulfillment and completion of the API INQUIRE call. The INQUIRE operation returns the value of the specified entity's attribute as the result. Attempts to inquire attributes on entities that are not attached via an outlet result in an ENTITY_ERROR exception being raised.

entity: Required parameter that specifies the entity whose method is to be invoked.

attribute: Optional parameter that specifies an attribute to be associated with the method invocation request. Valid attributes are defined by the ontology. If no attribute argument is provided, the null attribute is assumed.

name: Optional parameter that specifies a name to be associated with the method invocation request. Depending upon the language specific binding, the parameter is generally a string value, the use of which is defined by the adapter(s) connected to the entity. If no name argument is provided, a null name is assumed.

value: Optional parameter that specifies a value to be associated with the method invocation request. Depending upon the language specific binding, the parameter is generally a string value, the use of which is defined by the adapter(s) connected to the entity. If no value argument is provided, a null value is assumed.

parameter: Optional parameter that specifies an additional parameter to be associated with the method invocation request. Depending upon the language specific binding, this parameter is generally a scalar value (e.g. integer), the use of which is defined by the adapter(s) connected to the entity. If no parameter argument is provided, a null parameter is assumed.

precedence: Optional parameter that specifies the precedence level to be assigned to the invocation. Precedence determines which outlet is to be passed the invocation request. Specifically, the invocation is passed to the first adapter connected at the lowest precedence value greater than or equal to this parameter. If no parameter argument is provided, a null precedence is assumed, indicating that the request is passed to the first available (lowest precedence value) outlet.

timeout: Optional parameter that specifies the maximum wait time in seconds for the invocation. A value of 0 indicates that the invocation should not return until the operation has completed. If the maximum wait time is met, the operation terminates, raising a TIMEOUT_EXCEPTION. If no timeout argument is provided, a null timeout is assumed, as defined by the language specific binding.

authorization: Optional parameter that specifies the authorization under which the operation may be performed. If no authorization argument is provided, a null authorization is assumed.

Examples: API.Inquire (id, an_attribute, name, , , , my_authorization); value:=Invoke (id, an_attribute, name, name, 0, 1, my_authorization)

The REFERENCE/DEREFERNCE operations are provided in support of automated "garbage collection". Associated with each entity is a counter that records the number of times the entity has been referenced. When the REFERENCE operation is called, the request is forwarded to the server that manages the entity, which then increments this counter by one. Similarly, whenever the DEREFERENCE operation is called, this counter is decremented by one, unless if already equal to zero, in which case the operation has no effect. Associated with every entity is also a timestamp that records the Universal Time when the entity was created. When an entity reference count remains at zero beyond a fixed period of time, a garbage collection system, if included in an implementation, may choose to automatically delete the entity if it is non-persistent. Details of garbage collection including delay times and frequency of inspection are implementation defined. The parameters defined by the REFERENCE/DEREFERENCE operations are as follows:

Reference entity: Required parameter specifying entity to be connected.

authorization: Optional parameter that specifies the authorization under which the operation may be performed. If no authorization argument is provided, a null authorization is assumed.

Dereference entity: Required parameter specifying entity to be connected.

authorization: Optional parameter that specifies the authorization under which the operation may be performed. If no authorization argument is provided, a null authorization is assumed.

Examples: Reference (entity, my_authorization); Deference (entity);

Connections

The API defines three connection operations: CONNECT, DISCONNECT and CONNECTION.

The CONNECT operation is used to create a method connection to an entity. A connected method may be then subsequently accessed via the INVOKE operation (described above). The following parameters are defined for this operation:

entity: Required parameter specifying entity to be connected.

outlet: Required parameter specifying the outlet entity to be associated with the connection. This outlet is used for interfacing the external process that implements the specified method.

method: Optional parameter specifying the method to be connected to the entity. If no argument is specified, the null method is assumed. Connecting a null method signifies that the outlet is to receive all method invocation requests that occur at the specified precedence level.

precedence: Optional parameter that specifies the precedence level to be assigned to the connection. If no precedence argument is provided, a null precedence is assumed. When the value of this argument is null, the method is connected at the first available precedence level that exceeds the current highest precedence connection. That is, when a null precedence is specified, the connection will take higher precedence over prior connections. When a non-null precedence level is specified and a method is already connected to the entity at that level, an ENTITY_ERROR exception is raised.

authorization: Optional parameter that specifies the authorization under which the operation may be performed. If no authorization argument is provided, a null authorization is assumed.

Examples: entity:=Create("my entity");

Connect (entity, outlet, set_method); Invoke(entity, set_method).

The DISCONNECT operation is used to disconnect a method from an entity. If the specified method is not currently connected to the entity with the specified outlet, then the operation has no effect. The operation defines the following parameters:

entity: Required parameter specifying entity to be disconnected.

outlet: Required parameter specifying outlet entity is to be disconnected from.

method: Optional parameter specifying the method to be disconnected from the entity. If no argument is specified, the null method is assumed.

Disconnecting a null method signifies that a method connection that accepts all method values (i.e. originally connected with a null method) is to be disconnected.

precedence: Optional parameter that specifies the precedence level of the connection to be disconnected. If no precedence argument is provided, a null precedence is assumed. When the value of this argument is null, the connection with the highest precedence value that matches the specified method value is disconnected. If no matching connection is found for the specified method, outlet, and precedence level, the operation has no effect.

authorization: Optional parameter that specifies the authorization under which the operation may be performed. If no authorization argument is provided, a null authorization is assumed.

Example: Disconnect (entity, outlet, set_method);

Delete (entity).

The API provides the auxiliary operation CONNECTION to determine the outlet, method, and precedence of each of an entity's connections. Entity connections are indexed from 1 to the total number of connections that the entity possesses (available through the CONNECTIONS utility function defined below).

entity: Required parameter specifying the entity.

index: Required parameter specifying attachment to be retrieved.

authorization: Optional parameter that specifies the authorization under which the operation may be performed. If no authorization argument is provided, a null authorization is assumed.

outlet: Return value specifying the connection's outlet.

method: Return value specifying the connections' method.

precedence: Return value specifying the connection's precedence level.

Attachments

The API defines three attachment operations: ATTACH, DETACH and ATTACHMENT.

The ATTACH operation is used to create an attribute attachment to entity. An attached attribute may be then subsequently accessed via the INQURE operation (described above). The following parameters are defined for this operation:

entity: Required parameter specifying entity to be connected.

outlet: Required parameter specifying the outlet entity to be associated with the connection. This outlet is used for interfacing the external process that implements the specified method.

attribute: Optional parameter specifying the attribute to be attached to the entity. If no argument is specified, the null attribute is assumed. Attaching a null attribute signifies that the outlet is to receive all attribute inquisition requests that occur at the specified precedence level.

precedence: Optional parameter that specifies the precedence level to be assigned to the attachment. If no precedence argument is provided, a null precedence is assumed. When the value of this argument is null, the attribute is attached at the first available precedence level that exceeds the current highest precedence attachment. That is, when a null precedence is specified, the attachment will take higher precedence over prior attachments. When a non-null precedence level is specified and an attribute is already attached to the entity at that level, an ENTITY_ERROR exception is raised.

authorization: Optional parameter that specifies the authorization under which the operation may be performed. If no authorization argument is provided, a null authorization is assumed.

Examples: entity:=Create("my entity");

Attach (entity, outlet, location_attribute); Inquire(entity, location_attribute).

The DETACH operation is used to detach an attribute from an entity. If the specified attribute is not currently attached to the entity with the specified outlet, then the operation has no effect. The operation defines the following parameters:

entity: Required parameter specifying entity to be disconnected.

outlet: Required parameter specifying outlet entity is to be disconnected from.

attribute: Optional parameter specifying the attribute to be detached from the entity. If no argument is specified, the null attribute is assumed. Detaching a null attribute signifies that an attribute that accepts all attribute values (i.e. originally attached with a null attribute) is to be detached.

precedence: Optional parameter that specifies the precedence level of the attachment to be detached. If no precedence argument is provided, a null precedence is assumed. When the value of this argument is null, the attachment with the highest precedence value that matches the specified attribute value is detached. If no matching attachment is found for the specified attribute, outlet, and precedence level, the operation has no effect.

authorization: Optional parameter that specifies the authorization under which the operation may be performed. If no authorization argument is provided, a null authorization is assumed.

Example: Detach (entity, outlet, location_attribute);

Delete (entity).

The API provides the auxiliary function ATTACHMENT to determine the outlet, attribute, and precedence of each of an entity's attachments. Entity attachments are indexed from 1 to the total number of attachments that the entity possesses (available through the ATTACHMENTS utility function defined below).

entity: Required parameter specifying the entity.

index: Required parameter specifying attachment to be retrieved.

authorization: Optional parameter that specifies the authorization under which the operation may be performed. If no authorization argument is provided, a null authorization is assumed.

outlet: Return value specifying the connection's outlet.

attribute: Return value specifying the connections' attribute.

precedence: Return value specifying the connection's precedence level.

Outlets

The API provides a flexible method for dynamically interfacing external software components (i.e. adapters and analytics) to entities. The outlet construct serves this purpose. An outlet is an entity interface point that allows an adapter application to intercept and process the method invocations and attribute inquisitions requested of an entity. Outlets also provide a means for event subscribers to asynchronously receive entity event publication notices.

Internally, these two capabilities are provided using rendezvous and queuing type mechanisms.

Adapters are software processes that provide entities with their method and attribute behaviors. Specifically, adapters respond to the set of methods/attributes that may be invoked/inquired of an entity. To perform this role, adapters must communicate with entities through interface points so that when any of an entity's methods are invoked or its attributes inquired, the requests are forwarded to the correct adapters to fulfill. Adapters perform these operations via communication with an outlet. In concert with the CONNECT/DISCONNECT and ATTACH/DETACH operations described above, outlets provide the necessary interfacing points. After an entity is created, it must first be "activated" in order to receive any attachments or connections. Entity activation is necessary in order to ensure that the appropriate rendezvous/queueing resources have been allocated.

When an entity method is invoked or an attribute is inquired, the request is forwarded to the appropriate outlet as determined by the entity's connection/attachment list and the specified precedence level. Adapters are notified of such invocation/inquisition requests via these outlets. Specifically, when a method invocation/attribute invocation request is received at an outlet, the adapter communicating with the outlet is notified of the request, typically on a rendezvous or first-in-first-out basis. Adapters are notified using the callback parameter specified when they communicate with the outlet. It is this overall entity/outlet interfacing structure that contributes to the system's ability to operate in a highly distributed plug-in fashion, alleviating the need for any centralized components, and enabling its scalability.

In support of adapter processes, the API defines four basic outlet operations: ACTIVATE, DEACTIVATE, ADAPT and RESET.

The ACTIVATE operation is used to create an entity interface point (outlet). Internally, this involves the allocation of the resources necessary to support the rendezvous/queuing mechanisms the particular implementation requires. In order for an entity to have an attributes/methods attached/connection, the entity serving as the outlet must be persistent (i.e. designated as persistent when initially created via the CREATE operation). Attempts to activate an entity that is already activated has no effect. The DEACTIVATE operation is used to release the interface point resources allocated to an entity. If an entity has no outlet attached, the DETACH operation has no effect. The parameters defined for each are as follows:

Activate entity: Required parameter specifying entity to be activated.

authorization: Optional parameter that specifies the authorization under which the operation may be performed. If no authorization argument is provided, a null authorization is assumed.

Deactivate entity: Required parameter specifying entity to be deactivated.

authorization: Optional parameter that specifies the authorization under which the operation may be performed. If no authorization argument is provided, a null authorization is assumed.

Example: Create(entity,"my entity", . . . , my_authorization); Activate(entity, my_authorization);

Connect (entity, outlet, set_method, 1, my_authorization);

Disconnect (entity, outlet, set_method, 1, my_authorization); Deactivate(entity, my_authorization);

Delete (entity, my_authorization).

The ADAPT operation is used by software adapters to receive and process entity invocation requests. Adapters communicate with outlets via this operation. Execution of this operation awaits a rendezvous with a client software processes within the enterprise. The rendezvous occurs when the client requests invocation of an entity's method or inquisition of an entity's attribute (i.e. executes either the INVOKE or INQURE operation). These requests are forwarded to the server where the entity that is providing the outlet interfacing point is managed. When the request arrives at the outlet, the invocation/inquisition parameters are passed in rendezvous fashion to the adapter. The specific order of arrival at the outlet of the client request and the ADAPT operation call is not important. The outlet's role is to coordinate the two, transferring the request parameters to the adapter when the two meet.

This transfer is accomplished via the adapter parameter specified during the ADAPT call. This parameter specifies an adapter callback function (i.e. its address) to be called upon rendezvous at the outlet with an incoming INVOKE or INQUIRE request. The arguments specified by the client for this request are passed across the outlet rendezvous point to the adapter callback function. When the adapter has completed the invocation request, its return result is passed back across the outlet rendezvous point, and then reverse forwarded back to the requesting client process where it is returned as the response to the original INVOKE or INQUIRE operation. Specifications for the adapter callback functions are identical, however, the method argument for INQUIRE calls is always null. Adapter callback arguments are:

outlet: Identifier of the outlet where the rendezvous is occurring.

entity: Identifier of the entity whose method/attribute is being invoked/inquired.

method: Method argument, possibly null.
attribute: Attribute argument, possibly null.
name: Name argument, possibly null.
value: Value argument, possibly null.
Parameter: Parameter argument, possibly null.
precedence: Precedence level at which the request occurred, possibly null.

authorization: Optional parameter that specifies the authorization under which the operation may be performed. If no authorization argument is provided, a null authorization is assumed.

The ADAPT operation defines the following parameters: ADAPT.

outlet: Required parameter specifying the outlet to adapt.

adapter: Required parameter specifying the address of the adapter's callback function. If null, then any request received from the outlet will be discarded, returning a null result to the originating client.

authorization: Optional parameter that specifies the authorization under which the operation may be performed. If no authorization argument is provided, a null authorization is assumed.

EXAMPLE

```
-- Client:
    Create(entity,"my entity", ... , my_authorization);
    Connect(entity, outlet, set_method, , my_authorization);
    Invoke (entity, insert_method, "A.V. Terra", ... , my_authorization);
-- Adapter callback function
    function my_adapter (    outlet          : in outlet_type;
                             entity          : in entity_type;
                             method          : in
                             method_type;
                             attribute       : in
                             attribute_type;
                             name            : in name_type;
                             value           : in value_type;
                             parameter       : in
                             parameter_type)
                             return value_type is
    begin
        -- Process method invocation request
        return "Hello World!"
    end my_adapter;
-- Adapter
Adapt (outlet, my_adapter'access, my_authorization);
```

Activated entity outlets are designed to persist, as needed, throughout an entity's lifetime, independent of any adapter or supporting server infrastructure shutdowns and restarts. In the event of a component failure, however, the condition of an outlet can be left in an undefined state. For example, an outlet may have only partially completed the initial portion of an invocation or inquisition rendezvous, awaiting communication with an adapter that may have just failed. The RESET operation is used to resynchronize an outlet upon adapter restart. Under these circumstances, any pending request may be lost. However, the process issuing the original INVOKE or INQUIRE request will receive an ENTITY_ERROR exception to signal the incompletion of the operation to facilitate recovery. The RESET operation accepts the following arguments:

entity: Required parameter specifying entity to be reset.

authorization: Optional parameter that specifies the authorization under which the operation may be performed. If no authorization argument is provided, a null authorization is assumed.

Example

```
begin loop
        Adapt(outlet, my_adapter, my_authorization);
    end loop;
    exception
        when others => Reset(outlet, my_authorization);
    end;
```

Events

The API provides a method for asynchronous notification of events related to entities. The system uses a publish/subscribe type event notification model. That is, a process executes a "publish" operation for an event on an entity. When this operation is completed, all processes that have "subscribed" to this event on this entity will receive a notification. Processes receive event notifications via a subscriber communicating with an outlet. Subscriber communication is typically implemented using a procedural callback mechanism, similar to adapters with method invocations. For event operations, outlets provide a first-in/first-out queuing service. A single event publication can result in zero to many subscriber notifications. The server infrastructure does not prescribe what constitutes an event. Valid event types are defined by whatever accompanying ontology is associated with the instantiation. The API provides the following operations in support of event notification: PUBLISH, SUBSCRIBE, CANCEL, WAIT, CLEAR.

The PUBLISH operation is used to publish an event on an entity. Upon completion, all processes with active subscriptions to this event on the specified entity will receive a notification via a call to their specified subscriber procedure. This operation accepts the following four parameters:

entity: Required parameter specifying the entity associated with the event to be published.

event: Optional parameter specifying the event to be published. Valid events are defined by the ontology. If no event argument is provided, a null event for the specified entity is published, as defined by the ontology.

value: Optional parameter specifying a value to be included as part of the event notification. This parameter is provided to pass arguments to event subscribers and allow reuse of event handler/callbacks, differentiating event notification sequences. If no value argument is provided, a null value is included in the publication.

authorization: Optional parameter that specifies the authorization under which the operation may be performed. If no authorization argument is provided, a null authorization is assumed.

Example: Publish (entity, update_event, "A.V. Terra moved", my_authorization)

The SUBSCRIBE operation is used to subscribe to an event on an entity. Upon completion, any publication of the event for the specified entity will result in a notification to the specified outlet. This operation defines the following four parameters:

outlet: Required parameter specifying the outlet associated with the subscription.

entity: Required parameter specifying the entity being subscribed.

event: Optional parameter specifying the event being subscribed. If no event parameter is specified, then all events published on the specified entity will be subscribed.

authorization: Optional parameter that specifies the authorization under which the operation may be performed. If no authorization parameter is provided, a null authorization is assumed.

Example: Subscribe (outlet, entity, update_event, my_authorization)

The CANCEL operation is used to cancel an entity event subscription. Upon completion, any new publications of the event on the entity for the specified outlet will be ignored. If an event argument is not specified or specified as null, all event subscriptions for the entity on the specified outlet will be canceled. If no entity event subscriptions exist for the specified subscriber, the operation has no effect. This operation accepts the following four parameters:

entity: Required parameter specifying the entity being unsubscribed.

subscriber: Optional parameter specifying the subscriber procedure to be canceled. If not subscriber is specified or specified as null, then all subscriptions may by the calling process to the specified entity are unsubscribed.

event: Optional parameter that specifies the event subscription being canceled. If no event parameter is specified, then all event subscriptions associated with the specified entity for this subscriber are unsubscribed.

authorization: Optional parameter that specifies the authorization under which the operation may be performed. If no authorization parameter is provided, a null authorization is assumed.

Example: Canel (outlet, entity, update_event, my_authorization)

The WAIT operation is used by subscribers to receive and process entity event notifications. Subscribers communicate with outlets via this operation. Execution of this operation awaits a queue of published entity events. As processes publish event on entities, the publications are forwarded to the outlets specified by the subscribers. At the outlet, the events are queued on a first-in/first-out basis. Subscriber processes remove notifications from the queue using the WAIT operation. This operation includes a parameter that specifies the address of the subscriber to be called upon receipt of a notification in the queue.

Subscriber callback procedures are passed the following arguments originating from a client's PUBLISH operation request:

outlet: Parameter specifying the outlet that received the notification.

entity: Parameter specifying the entity on which the event was published.

event: Parameter that specifies the event that was published. Valid events are defined by the ontology. If no event argument was specified during publication, then a null event is passed.

value: Parameter that specifies an optional value included in the event publication.

If no value argument was provided during publication, then a null value is passed.

The WAIT operation defines the following parameters: WAIT.

outlet: Required parameter specifying the outlet to wait for an event.

subscriber: Required parameter specifying the address of the subscriber's callback procedure. If null, the event notification is received, but discarded.

authorization: Optional parameter that specifies the authorization under which the operation may be performed. If no authorization argument is provided, a null authorization is assumed.

Example:—Publisher

```
Publish (entity, update_event, "A.V. Terra moved" , my_authorization)
-- Subscriber callback procedure
procedure my_subscriber  (    outlet    : in outlet_type;
                              entity    : in entity_type;
                              event     : in event_type;
                              value     : in value_type) is
```

-continued

```
begin
    -- Process event notification
    return;
end my_subscriber;
-- Subscriber
Subscribe(outlet, entity, update_event,
my_authorization); Wait( outlet, my_subscriber'access,
my_authorization);
```

Auxiliary Elements

Complementary to the operations described above, the API specifies a collection of auxiliary operations, utility functions and error conditions.

The API specifies a set of utility functions to aid working with entities and corresponding activated outlets. Several of these functions are provided to help access standard entity features such as an entity's name, class, or subclass, and various state parameters such as creation time and activation status. Other functions are provided specifically to aid with entity universal unique identifiers and authorizations.

Various elements of an implementation purposefully hidden from the API user in order to reduce unnecessary software dependencies and coupling, functions are provided to aid persisting entity identifiers. For example, when an adapter creates and activates an outlet, the outlet persists until it is explicitly deactivated and deleted. However, the adapter processes that interface with the outlet may need to be stopped and/or restarted many times throughout its lifetime. To reestablish communication with an outlet, the restarted adapter needs a means of determining the outlet's identifier. As such implementation details are private, utility functions are provided to obtain text string values that adapters and other applications can use to persist locally. When such processes restart, the ENTITY_OF utility function, in concert with the OUTLET and SERVER utility functions, can be used to obtain entity identifiers based on these persisted string values. The precise format of these strings, however, is implementation defined and potentially subject to change across major system version releases as would be understood by one skilled in the art.

The following utility functions are defined in the API.

NAME Given an entity, returns a string with the name associated with that entity.

CLASS Given an entity, returns the ontology class assigned to that entity.

SUBCLASS Given an entity, returns the ontology subclass assigned to that entity.

SERVER Given an entity, returns the identifier of the server that manages the entity.

REDIRECTION Given an entity, returns the redirected value of that entity.

TIMESTAMP Given an entity, returns the creation timestamp for that entity.

PERSISTENT Given an entity, returns the persistence value for the entity.

AVAILABLE Given an entity, returns the network availability of the entity.

ACTIVATED Given an entity, returns whether or not an entity's outlet has been activated.

REFERENCES Given an entity, returns the current reference count for that entity.

CONNECTIONS Given an entity, returns number of entity's connections.

ATTACHMENTS Given an entity, returns number of entity's attachments.

SUBSCRIPTIONS Given an entity, returns number of entity's subscriptions.

The entity text string format accepted/returned by the following utility functions is implementation defined:

STRING_OF Given an entity, returns a text string value of the entity's identifier ENTITY_OF Given an entity identifier's text string value, returns an entity identifier The authorization text string format accepted by the following utility function is implementation defined:

AUTHORIZATION Given an authorization text string value, return an authorization

The API provides two specific operations for communicating key configuration parameters directly to a running server. These parameters involve entity redirection and entity forwarding. Regarding entity redirection, the system allows certain sets of entity identifiers to be automatically "redirected" to other entities. This capability is provided in support of higher-level layered services that may require the use of "well-known" entity identifiers. The REDIRECT operation is provided for this purpose. The details of how higher-level services use entity redirection is implementation defined. The operation recognizes the following parameters:

server: Required parameter specifying the server entity where the redirect operation is to be performed.

from: Required parameter specifying entity identifier to be redirected.

to: Required parameter specifying identifier entity is to be redirected to.

authorization: Optional parameter that specifies the authorization under which the operation may be performed. If no authorization argument is provided, a null authorization is assumed.

Example: API.Invoke (id, a_method, an_attribute, "My name",,, my_authorization); value:=Invoke (id, a_method, an_attribute, name, 0, 1, my_authorization).

In support of deployments that span a wide area network (e.g. the Internet) and potentially multiple private local area networks (e.g. using Dynamic Host Control Protocol (DHCP) and Network Address Translation (NAT) services), each server provides a peer-to-peer routing capability for forwarding API requests between servers within and across these networks. The CONFIGURE operation is used to set a local server's gateway parameters including the identifiers of its public wide-area and private local-area network. The structure of these identifiers and the effects of this operations is implementation defined are not intended for typical analytic use.

gateway: Required parameter specifying the gateway routing parameters for the local server.

authorization: Optional parameter that specifies the authorization under which the operation may be performed. If no authorization argument is provided, a null authorization is assumed.

The API defines a set of error exceptions that may be raised during the execution of its operations. The specific mechanism used to implement exception conditions is dependent upon the language-specific binding. Defined error exceptions include the following:

entity_error: Raised when an invalid entity operation is requested.

outlet_error: Raised when an invalid outlet operation is requested.

timeout_error: Raised when an invocation/inquisition fails due to timer expiration.

authorization_error: Raised when an invalid or insufficient authorization is specified.

adapter_error: Raised when an error in an adapter is detected subscriber_error: Raised when an error in a subscriber is detected protocol_error: Raised when an error in communication protocol is detected network_error: Raised when an operation cannot be completed due to network failure The API described herein was specifically devised to support and maintain compatibility across a diverse range of computing alternatives including single host platforms, local-area compute clusters, and wide-area networks. The implementation choices of entity and outlet have thus been characterized as implementation private to help better assure upper layer software interoperability and reuse. Leveraging current open source technologies, alternative implementations incorporate entity identifiers using RFC4122 to obtain a Universally Unique Identifiers (UUID) URN Namespace. In these open or non-private implementations, outlets are statically configured using traditional web services, and identified by a Universal Reference Identifier (URI). The outlet operations defined above, therefore, are implicit in the web service interactions and may not be directly relevant or required in this alternative open/non-private implementation. In the open configuration, the private internal identifier formats for entities and any corresponding outlets may vary to leverage the deployed open source resources and technologies.

In expectation of knowledge space privacy support, the embodiment particularly described herein, implements entities and outlets using a UUID format that is identical across both object types. In this implementation, all object identifiers consist of 128-bit values with the upper 32 bits designating a globally unique public host identifier, the next 32 bits designating a locally unique local host identifier, and the lower 64 bits designating a locally unique entity identifier. As a convention, such identifiers are written in text as "<P|H|U>" where P is the 32-bit globally unique public host identifier (a 32-bit unsigned integer, possibly equal to 0), H is typically a locally unique host identifier (a 32-bit unsigned integer), and U is the locally unique entity value (an unsigned 64-bit integer). In the V3 reference design, servers and outlets are considered simply special cases of entities and use the same identifier convention. These entity types are essentially indistinguishable from other entity types, although the API operations that can be performed upon them are limited. For example, methods and attributes cannot be connected/attached to server entities; attempts to do so result in an exception being raised, or the operation may be ignored. The upper 64-bits (P|H) typically identify a server entity's public and private host identifiers, as with all entities.

However, the lower 64-bits (U) of server entities is always zero, specifically signifying that the entity is a server entity. In contrast, entities with a host (PH) value of zero are reserved for "well-known" entity identifier values, which implementations may choose to define accordingly. For example, in the exemplary embodiment described herein, the entity identifier <0|0|1> serves as the "master registry" entity identifier. The API REDIRECT operation is used to map these well-known identifier types to actual entity identifier counterparts. The outlets are simply entities with connection and attachment interface point resources internally allocated (activated). An outlet identifier and the identifier of the entity associated with the outlet are identical. In essence, an outlet is indistinguishable from its entity. The separation of these two concepts is encouraged, however, in order to enable alternative implementations for both backward and anticipated future compatibility.

The API services described herein are layered upon a Hypergraph Transfer Protocol (HGTP) used for all communication between participating clients and servers, and between participating servers. In the exemplary embodiments, client applications typically need not interact directly with servers at the HGTP level. Instead, clients communicate using the API which performs the appropriate HGTP transactions on their behalf.

The global-scale information sharing system (See FIG. 1) referenced herein and described in the Cross-Referenced Applications uses a peer-to-peer server style infrastructure to create a distributed knowledge representation space. Client applications need only communicate with one of the servers in this infrastructure (e.g. a server running on the local computer or perhaps elsewhere on the local area network). When a client makes an entity request (e.g. via an API call), the server that receives the request determines if it is the server that manages the specified entity. This is performed by examining the entity's universal unique identifier (UUID) which internally encodes the network address of the entity's management server. If the entity is managed by the receiving server, then this server fulfills the request, sending back an appropriate response to the client. However, if the entity is managed elsewhere, then the server forwards the request to a peer participating server, as determined by its routing algorithm, to help the request reach the necessary final destination server. When the server forwards this request to the peer server, it again uses HGTP to communicate. However, the server then behaves as a client to the peer server.

HGTP is a text-based socket stream protocol communicated between Internet computers via the Transmission Control Protocol (TCP) or Transport Layer Security (TLS) protocol. As described above with reference to the API, the primary objects manipulated via this protocol are entities, the fundamental construct of the knowledge space. These entities are representations of knowledge items governed by an external ontology. Ontology references occur at the API or higher application level in order preserver HGTP's ontological neutrality.

HGTP typically follows a simple command/response message model. A client application makes a request by sending a message to a server. The server performs the operation, if possible, sending a return message with an acknowledgement and any result. If the server is unable to perform the operation, an error message is returned instead. A single request made to a server, however, may initiate other messages to potentially other servers and clients. The INVOKE and INQURE operations are two key operations where this occurs. Invoking an entity method, or inquiring an entity attribute results in a server forwarding a CALL request to the appropriate adapter that is connected or attached, respectively. Similarly, publication of an entity event results in a NOTIFY request being forwarded to the appropriate subscriber(s).

HGTP uses a text-based, variable length format for all messages. The character encodings within each message conform to the American Standard Code for Information Interchange (US-ASCII), or the more general Unicode Transformation Format with 8-bit variable width encoding (UTF-8). Numeric text values are transmitted in network byte order (i.e. "Big-Endian"). HGTP messages are transported using TCP (or provisionally, UDP) or TLS. In a preferred exemplary embodiment, socket communication is through port 20057.

The first field of every message transmitted by a client is the HGTP message code. This code indicates the specific type of transaction being requested and determines the fields present in the remainder of the message. All messages, whether from a client or server are null terminated with the ASCII 'NUL' character (i.e. decimal value 0; hex value 0). Successful responses from the server begin with the ASCII 'ACK' character (i.e. decimal value 6; hex value 6). Unsuccessful server responses begin with the ASCII 'NAK' character (i.e. decimal value 21; hex value 15), followed by an error code.

In a preferred exemplary embodiment, the HGTP contains 28 different message types. A typical message exchange involves a client opening a socket connection to a server listening on port 20057. The client sends the properly formatted message consisting of a set of message fields, each separated by the ASCII 'space' character (decimal value 32; hex value 20). Upon sending the message, the client then awaits a return message, which indicates either success (ACK), or failure (NAK) and an error code. No 'space' character is required immediately after the HGTP message code, 'ACK' or 'NAK' characters, nor immediately preceding the 'NUL' message termination code. Also, the 'NUL' character cannot be embedded within name, value, or result strings.

To minimize the computational burden to the network protocol stack, an API implementation may choose to leave the socket open for subsequent reuse in the event of another client request to the same server. A timer (e.g., 1 minute) is generally affixed to this socket to ensure eventual closing of any dormant sockets. Upon expiration of this timer, the BYE message is sent by a client to notify the server of an orderly socket shutdown. A client and/or a server may each also choose to unilaterally shutdown a connection in the event of application termination or an unrecoverable error condition (e.g. protocol error). The message formats and message field definitions for each of the HGTP message types are described in the sections that follow and illustrated in the corresponding figures.

Figure 2:
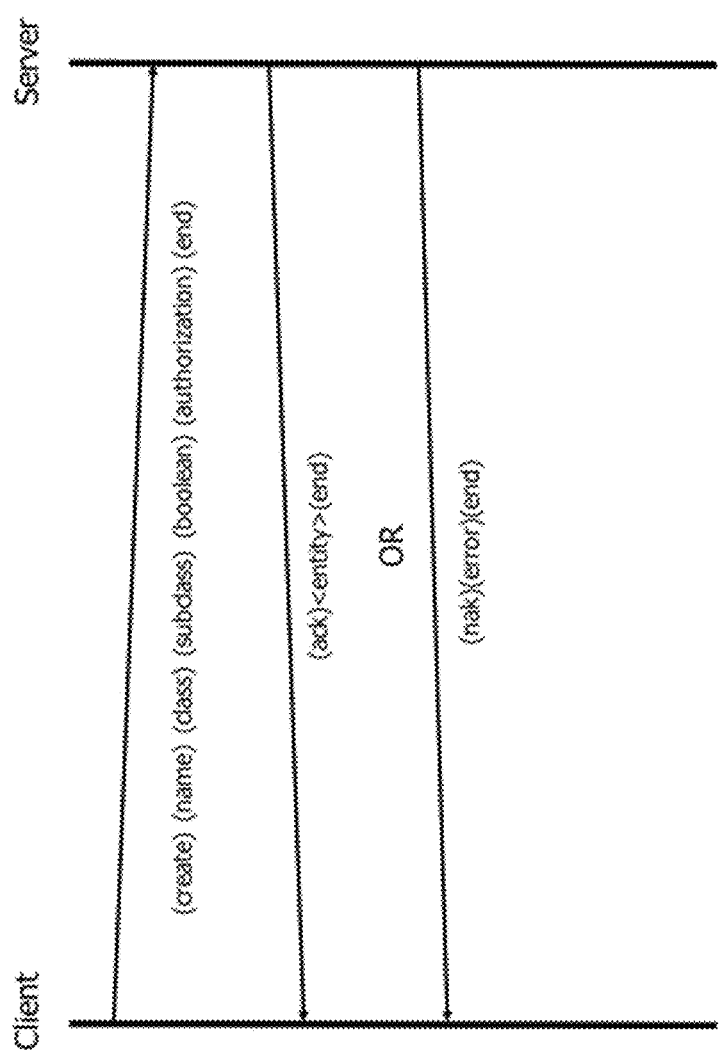
FIG. 2 illustrates the HGTP protocol for the API CREATE operation in accordance with a preferred embodiment.
Figure 3:
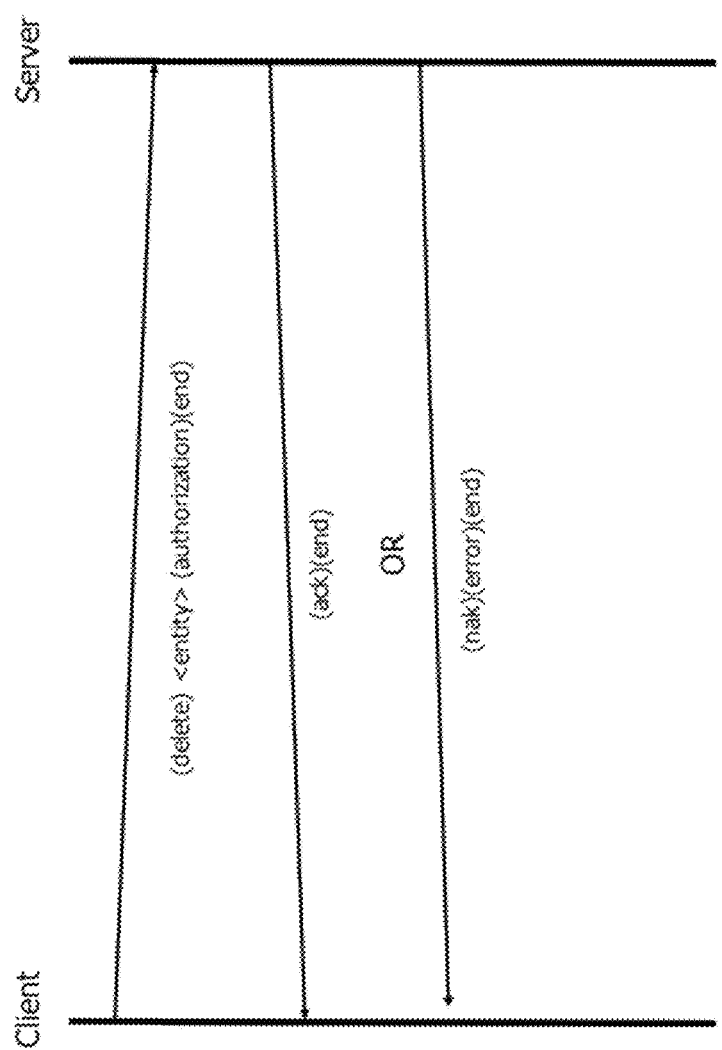
FIG. 3 illustrates the HGTP protocol for the API DELETE operation in accordance with a preferred embodiment.
Figure 4:
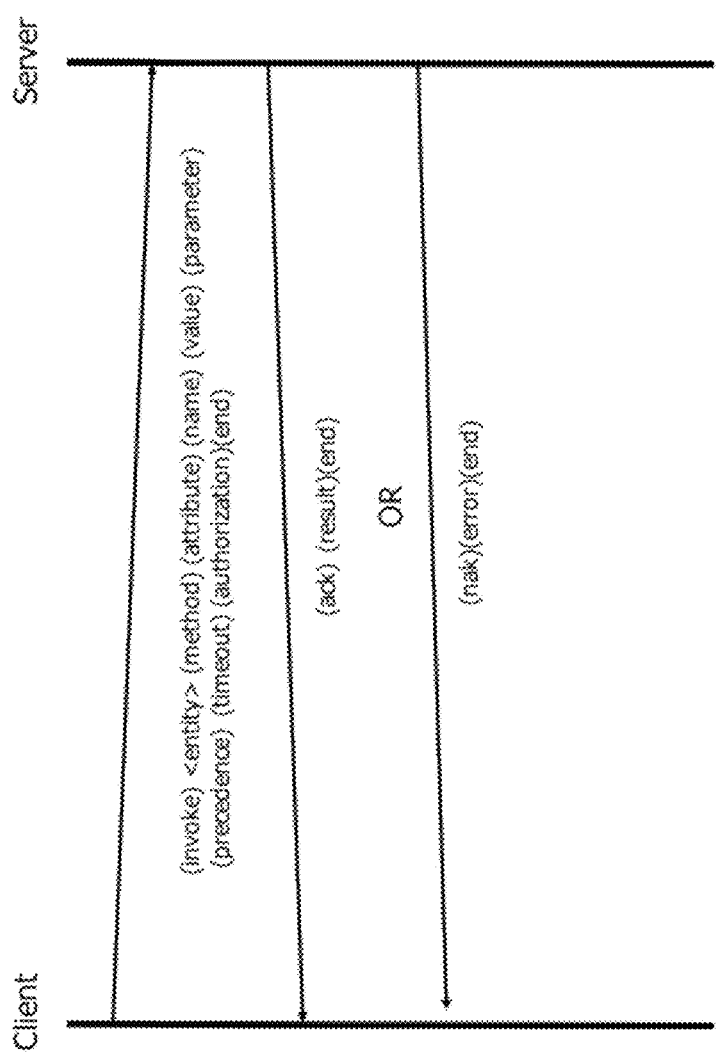
FIG. 4 illustrates the HGTP protocol for the API INVOKE operation in accordance with a preferred embodiment.
Figure 5:
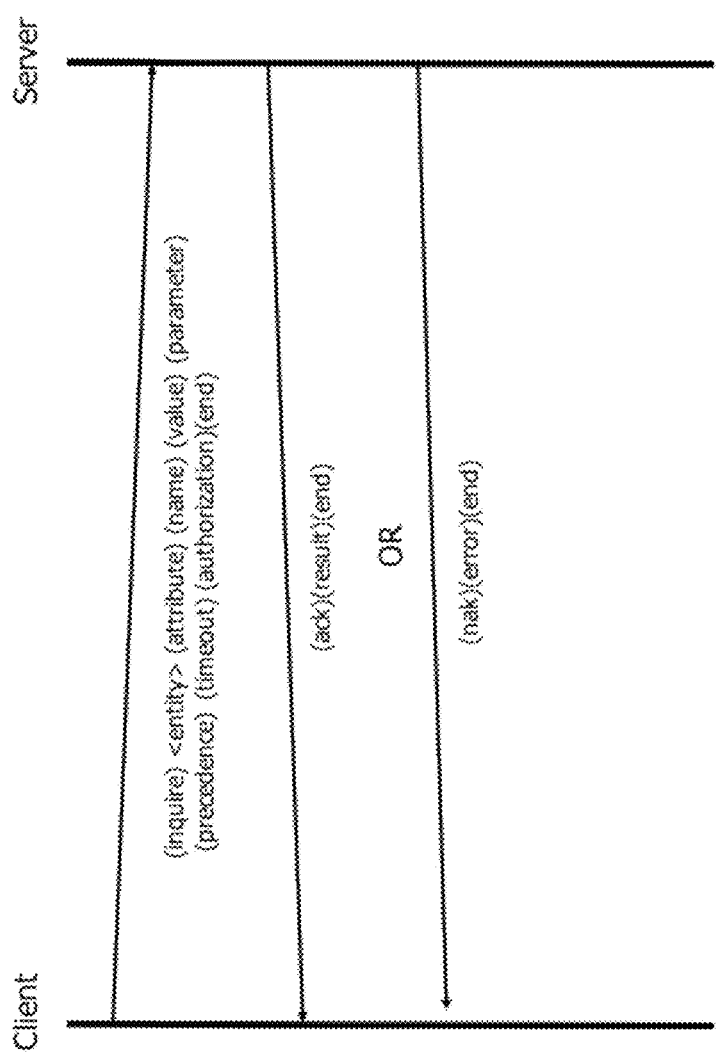
FIG. 5 illustrates the HGTP protocol for the API INQUIRE operation in accordance with a preferred embodiment.
Figure 6:
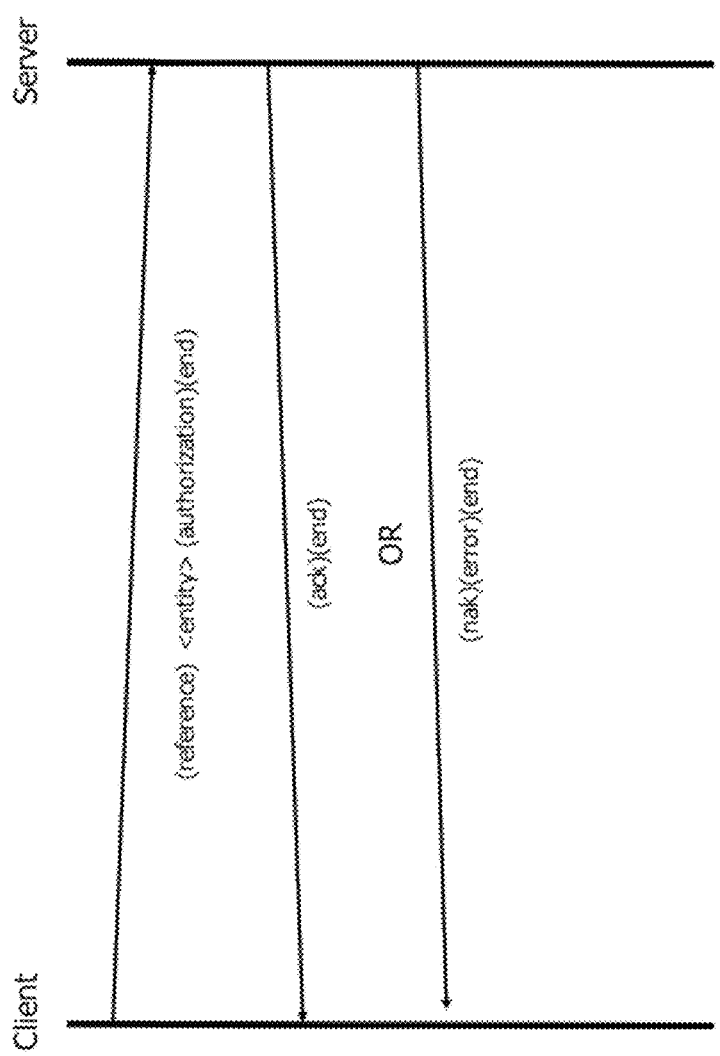
FIG. 6 illustrates the HGTP protocol for the API REFERENCE operation in accordance with a preferred embodiment.
Figure 7:
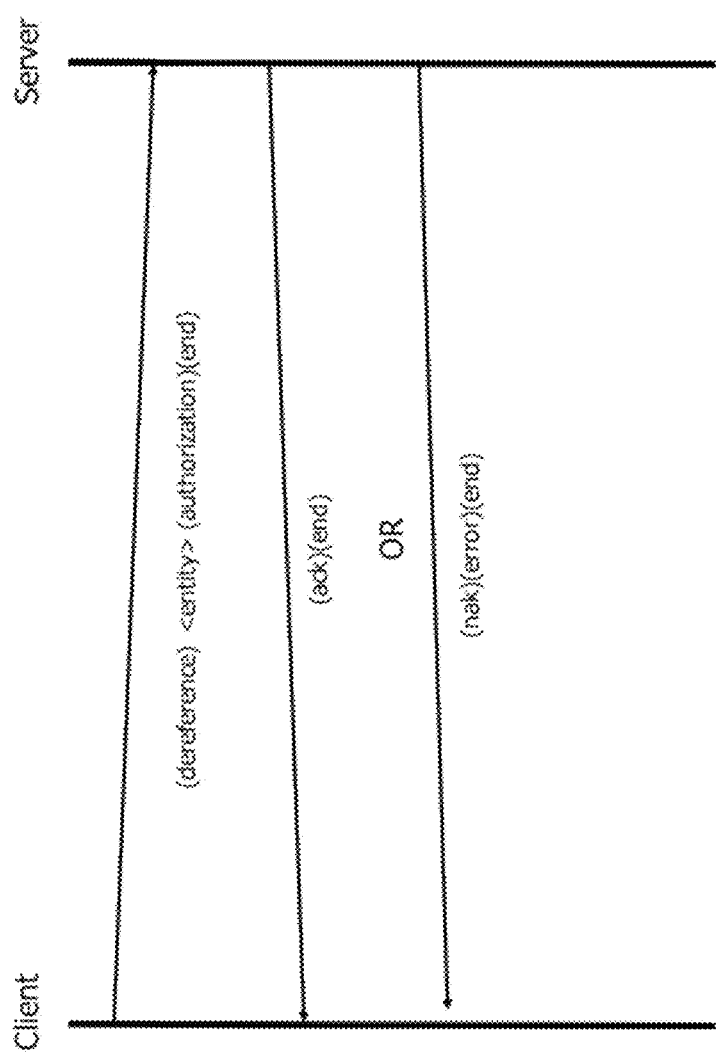
FIG. 7 illustrates the HGTP protocol for the API DEREFERENCE operation in accordance with a preferred embodiment.
Figure 8:
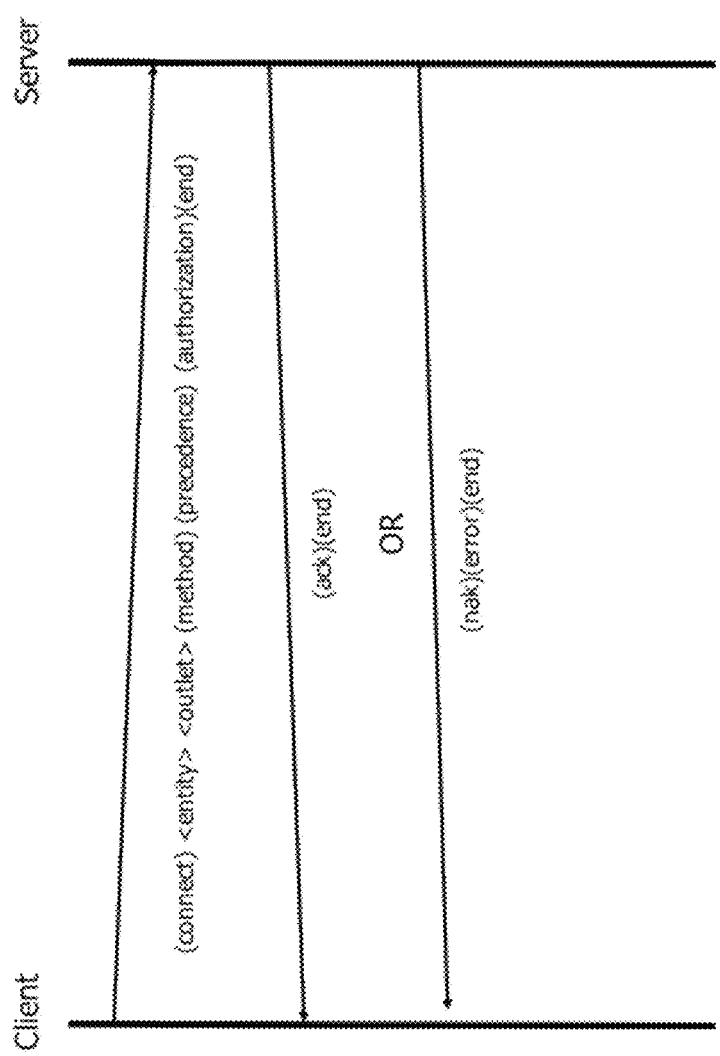
FIG. 8 illustrates the HGTP protocol for the API CONNECT operation in accordance with a preferred embodiment.
Figure 9:
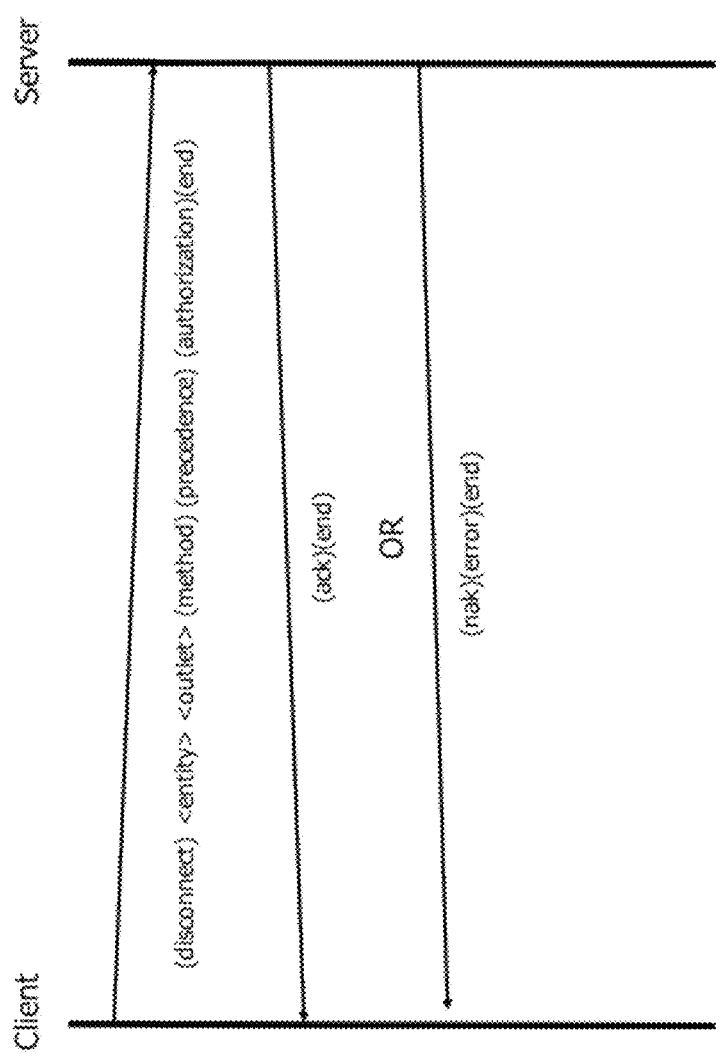
FIG. 9 illustrates the HGTP protocol for the API DISCONNECT operation in accordance with a preferred embodiment.
Figure 10:
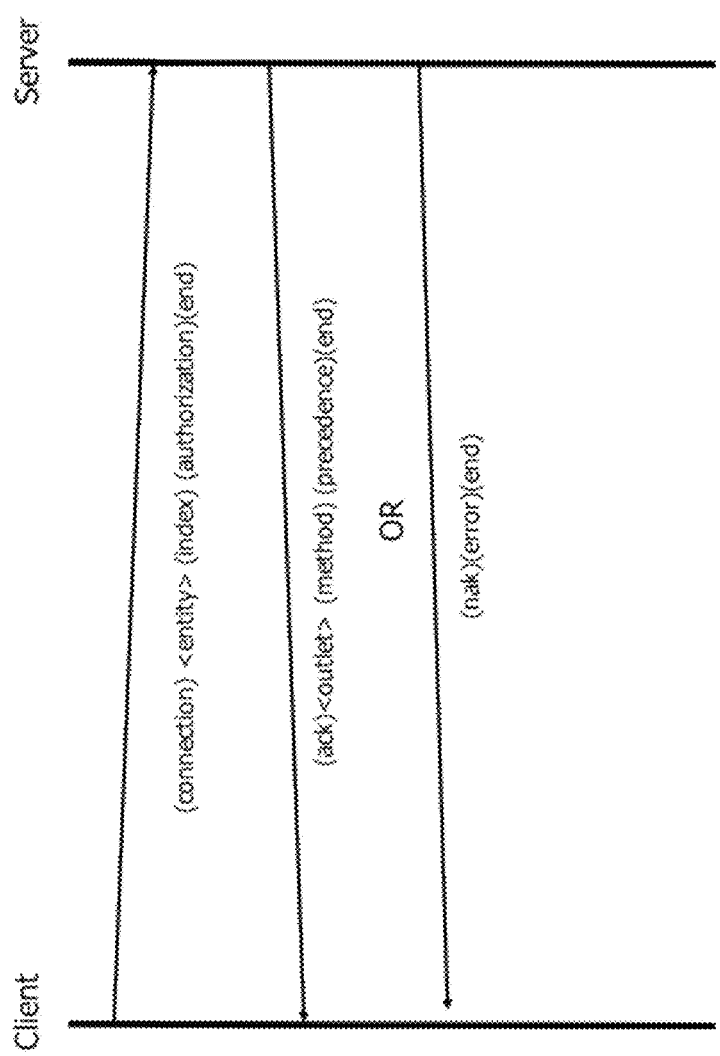
FIG. 10 illustrates the HGTP protocol for the API CONNECTION operation in accordance with a preferred embodiment.
Figure 11:
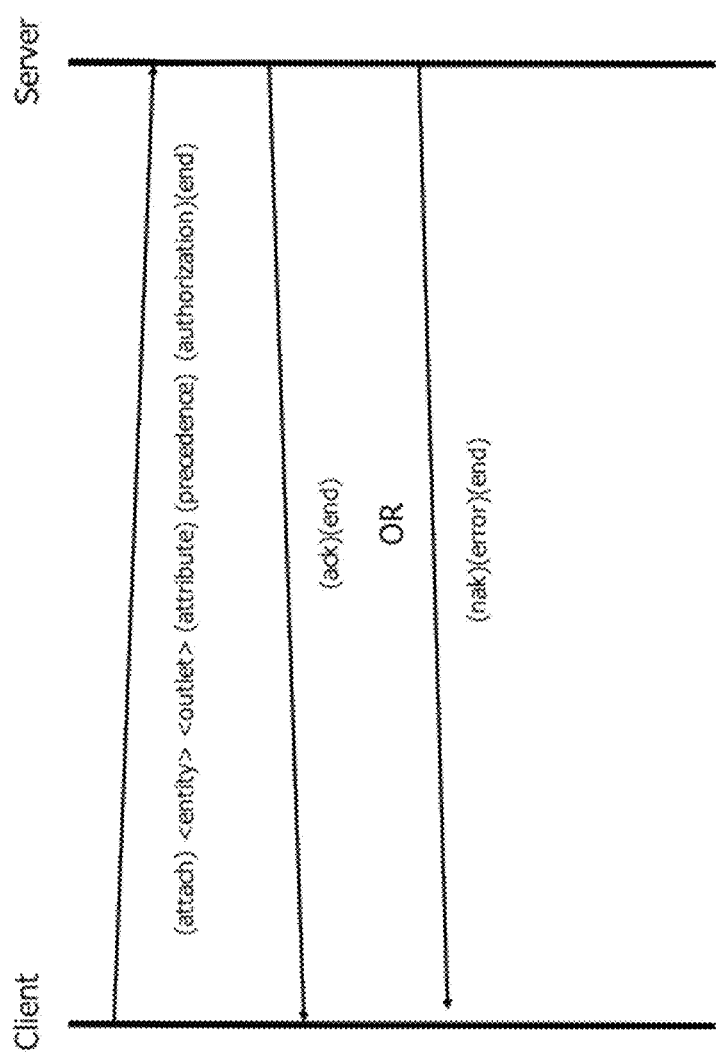
FIG. 11 illustrates the HGTP protocol for the API ATTACH operation in accordance with a preferred embodiment.
Figure 12:
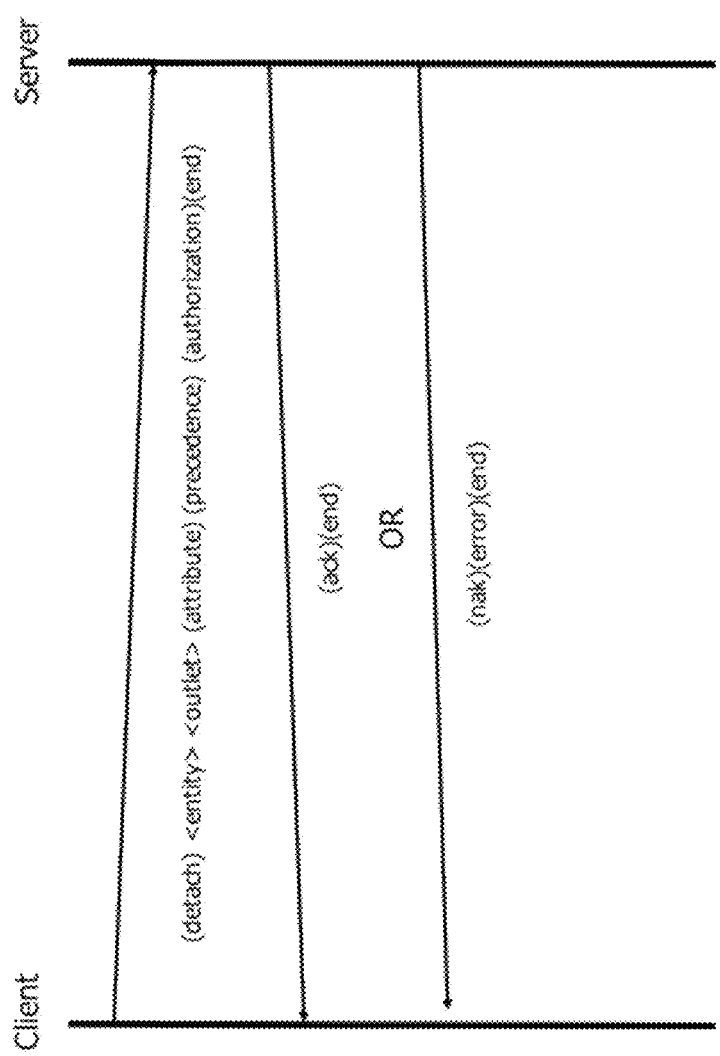
FIG. 12 illustrates the HGTP protocol for the API DETACH operation in accordance with a preferred embodiment.
Figure 13:
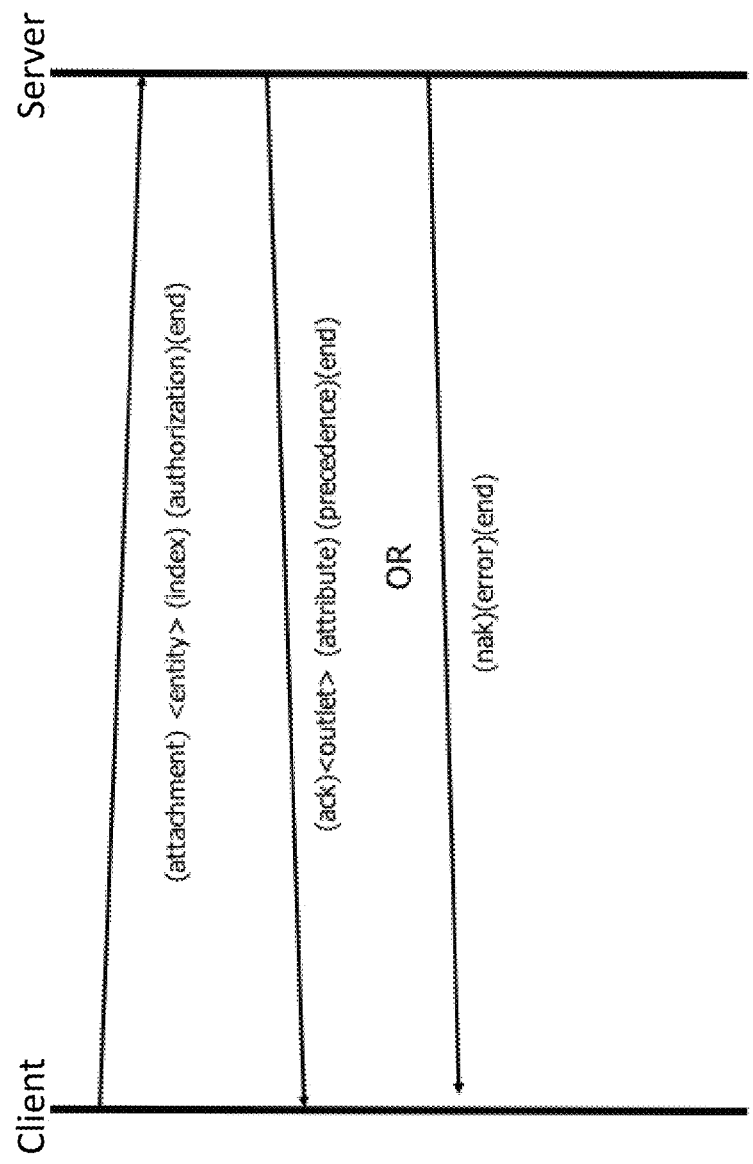
FIG. 13 illustrates the HGTP protocol for the API ATTACHMENT operation in accordance with a preferred embodiment.
Figure 14:
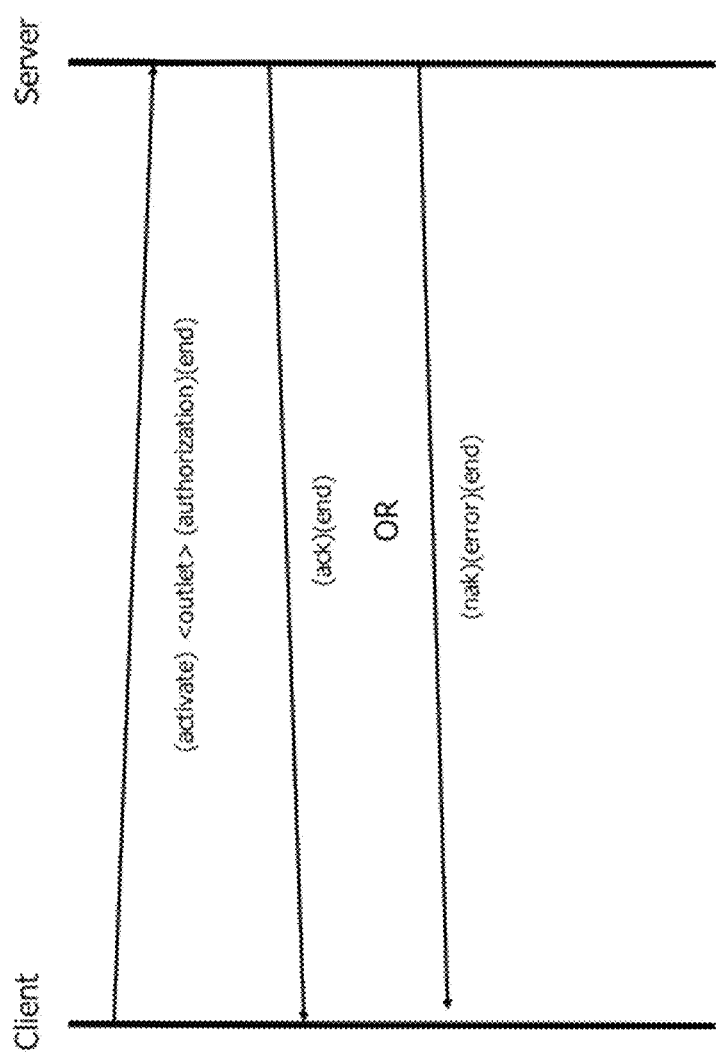
FIG. 14 illustrates the HGTP protocol for the API ACTIVATE operation in accordance with a preferred embodiment.
Figure 15:
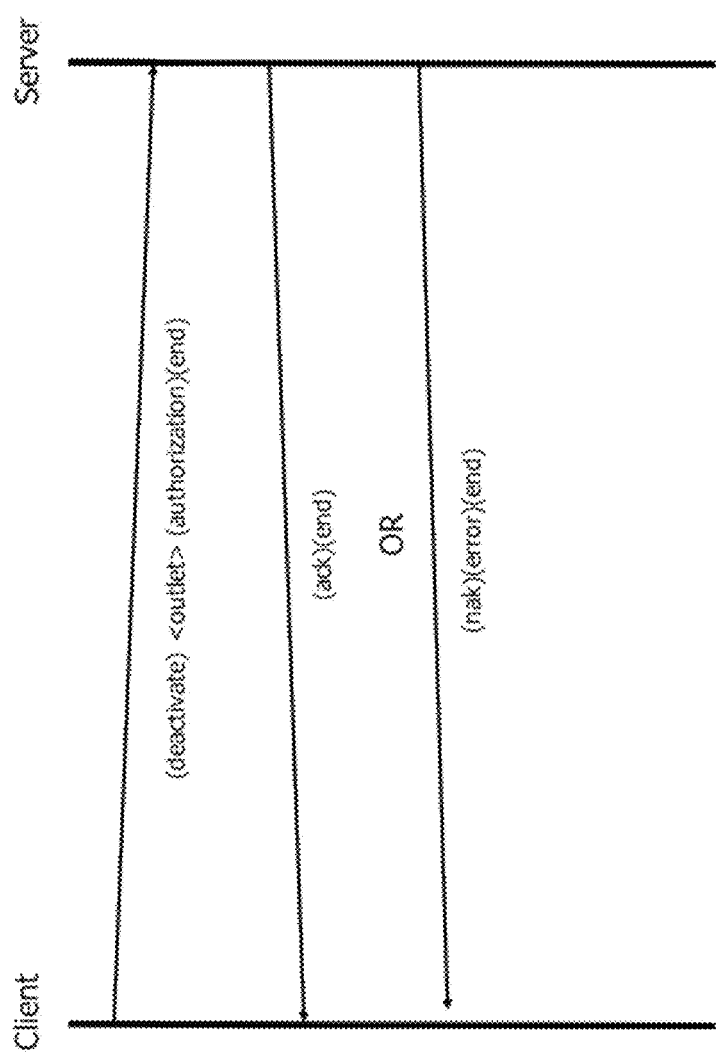
FIG. 15 illustrates the HGTP protocol for the API DEACTIVATE operation in accordance with a preferred embodiment.
Figure 16:
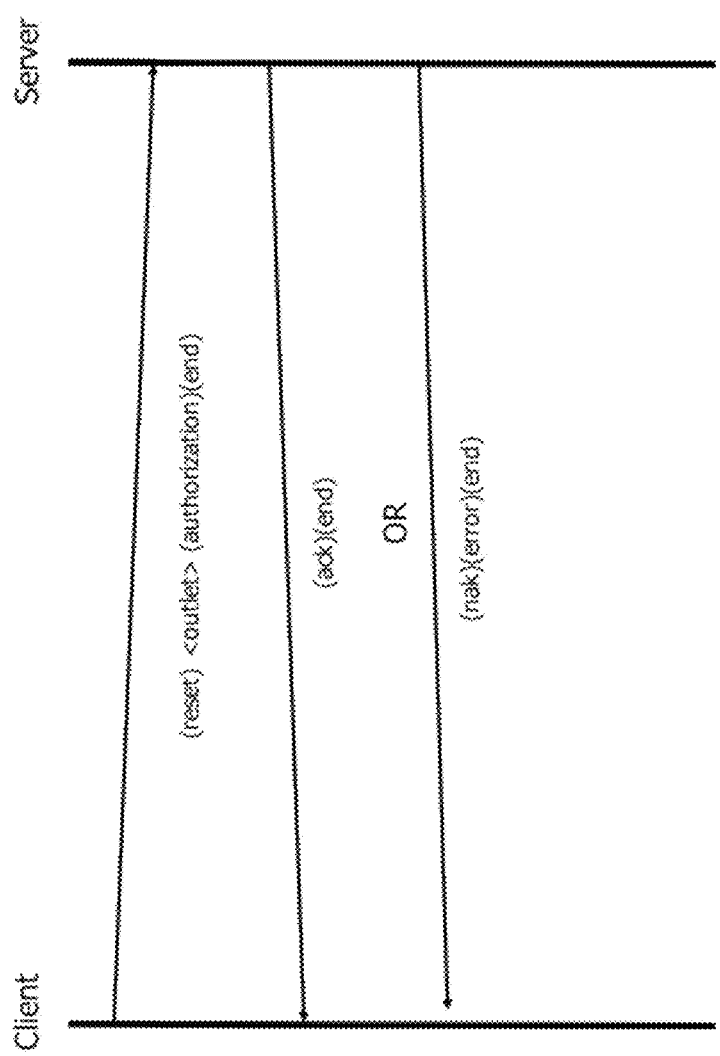
FIG. 16 illustrates the HGTP protocol for the API RESET operation in accordance with a preferred embodiment.
Figure 17:
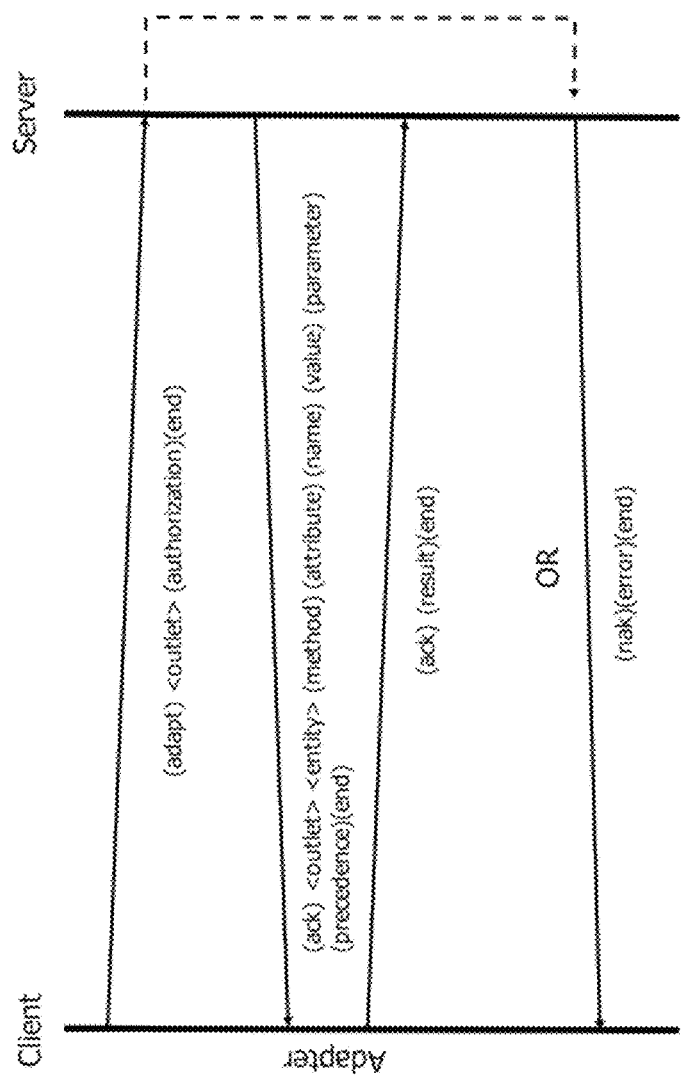
FIG. 17 illustrates the HGTP protocol for the API ADAPT operation in accordance with a preferred embodiment.
Figure 18:
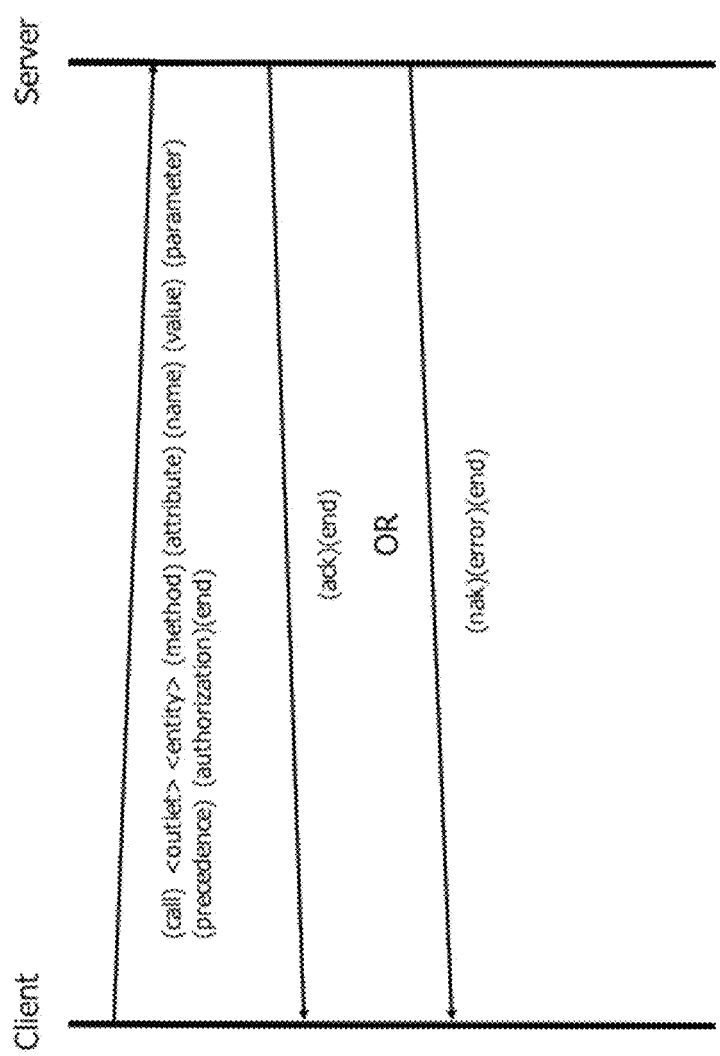
FIG. 18 illustrates the HGTP protocol for the API CALL operation in accordance with a preferred embodiment.
Figure 19:
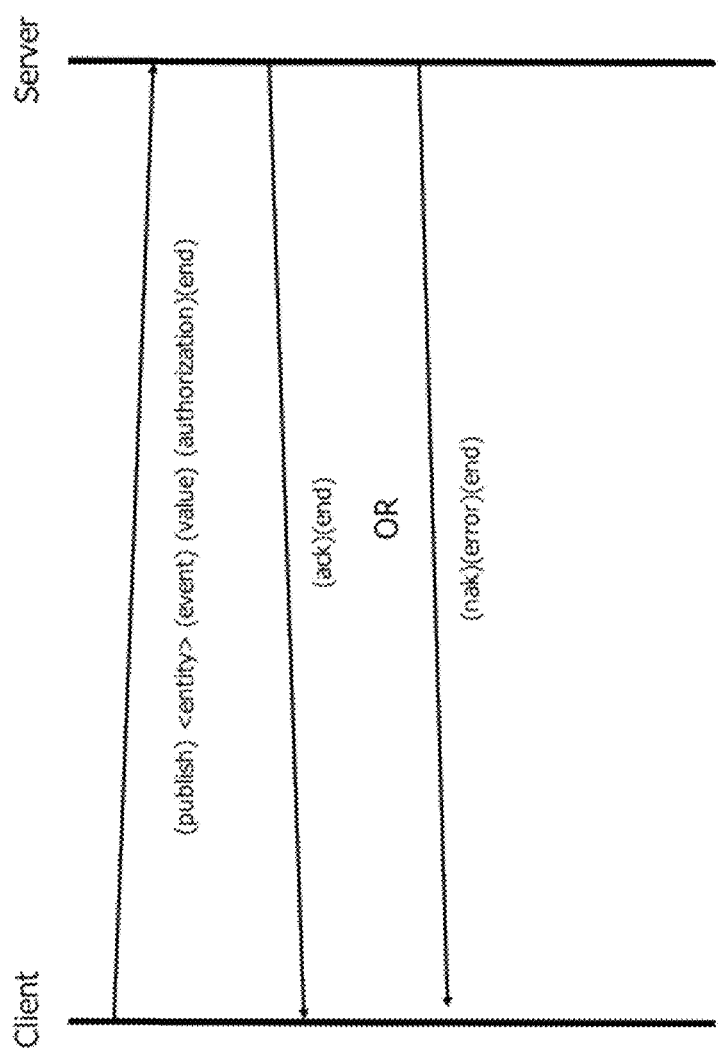
FIG. 19 illustrates the HGTP protocol for the API PUBLISH operation in accordance with a preferred embodiment.
Figure 20:
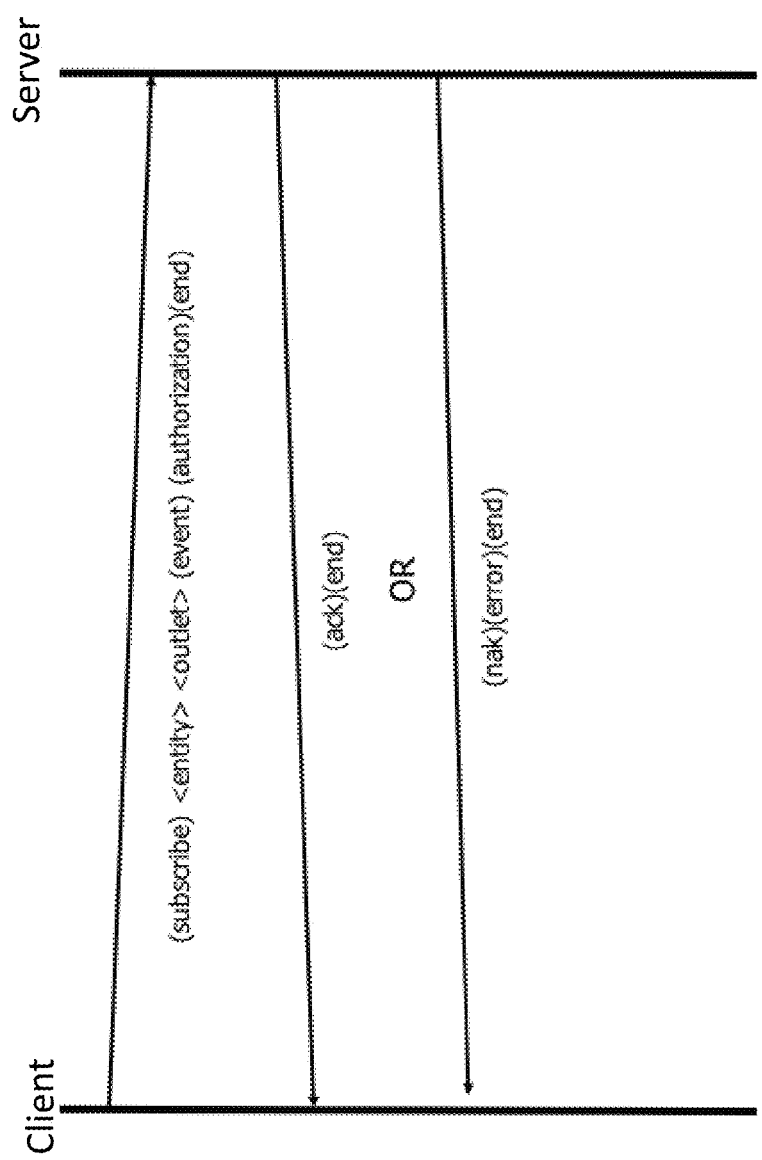
FIG. 20 illustrates the HGTP protocol for the API SUBSCRIBE operation in accordance with a preferred embodiment.
Figure 21:
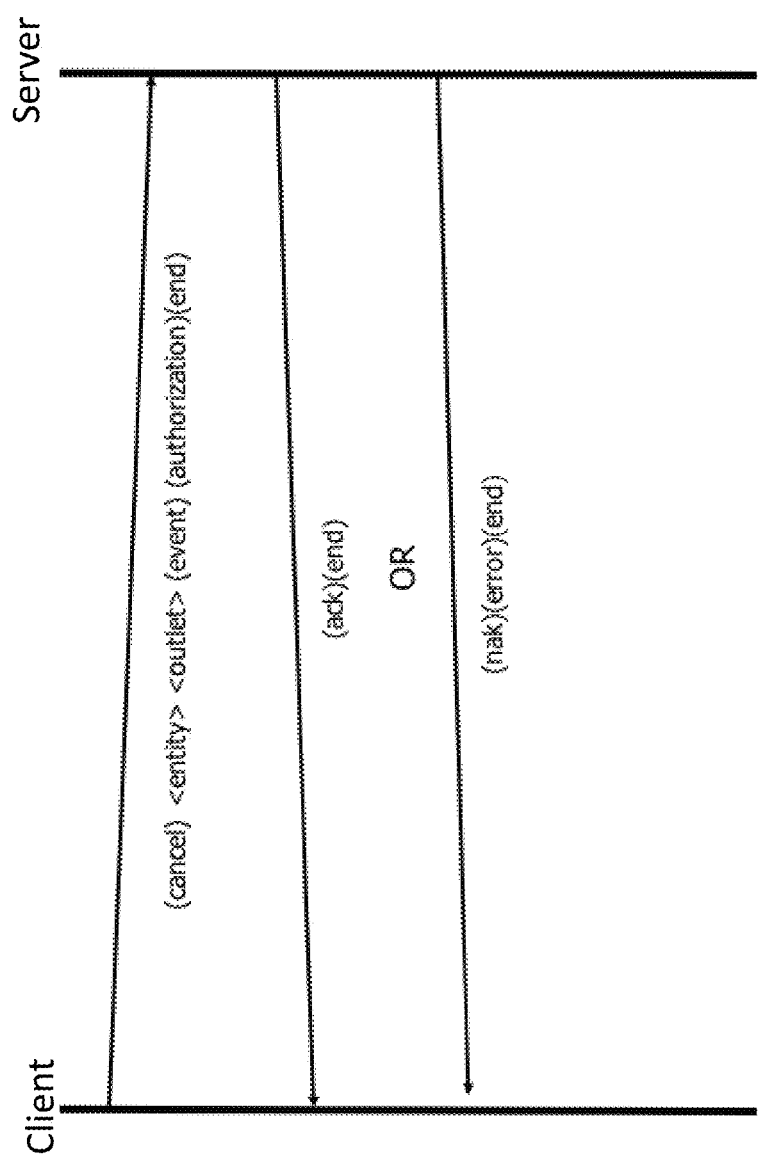
FIG. 21 illustrates the HGTP protocol for the API CANCEL operation in accordance with a preferred embodiment.
Figure 22:
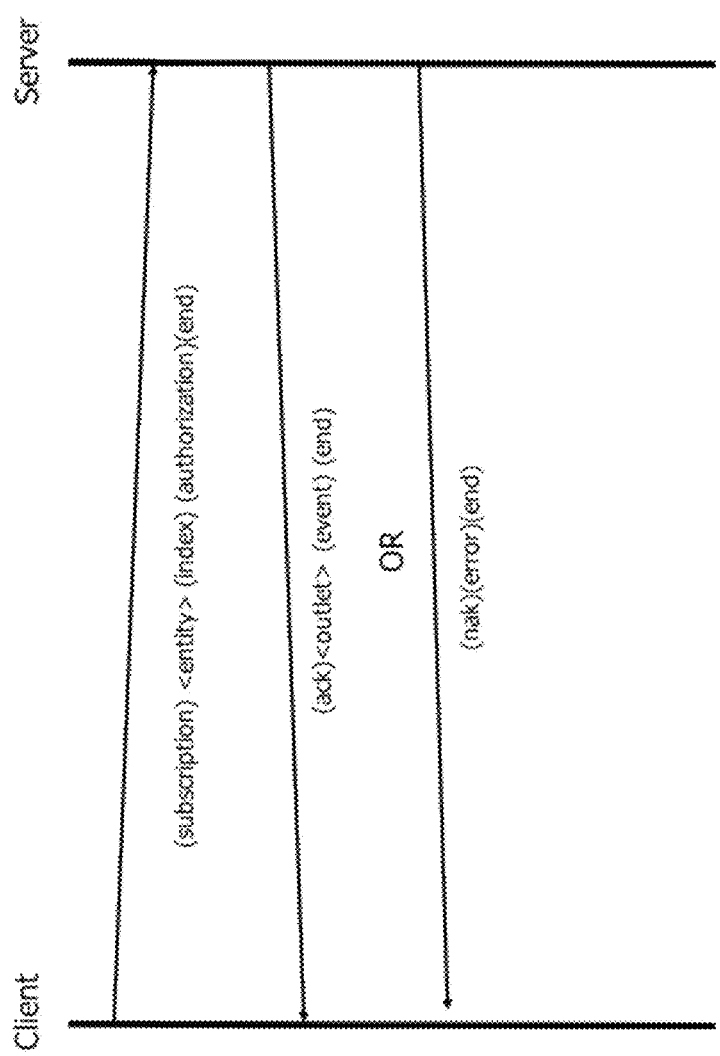
FIG. 22 illustrates the HGTP protocol for the API SUBSCRIPTION operation in accordance with a preferred embodiment.
Figure 23:
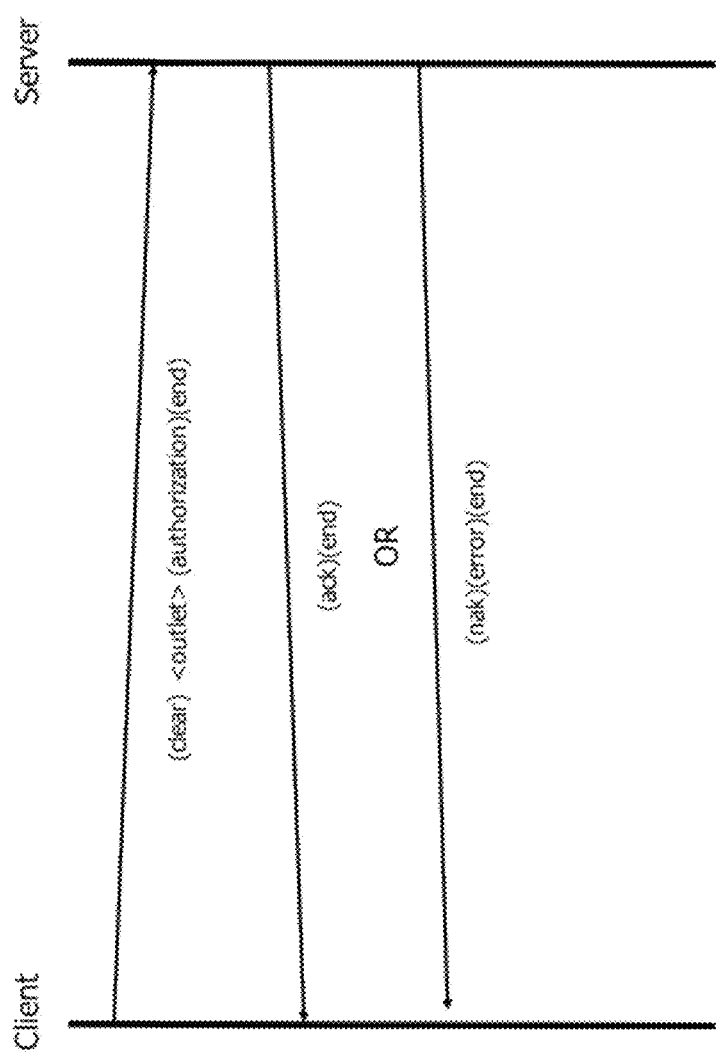
FIG. 23 illustrates the HGTP protocol for the API CLEAR operation in accordance with a preferred embodiment.
Figure 24:
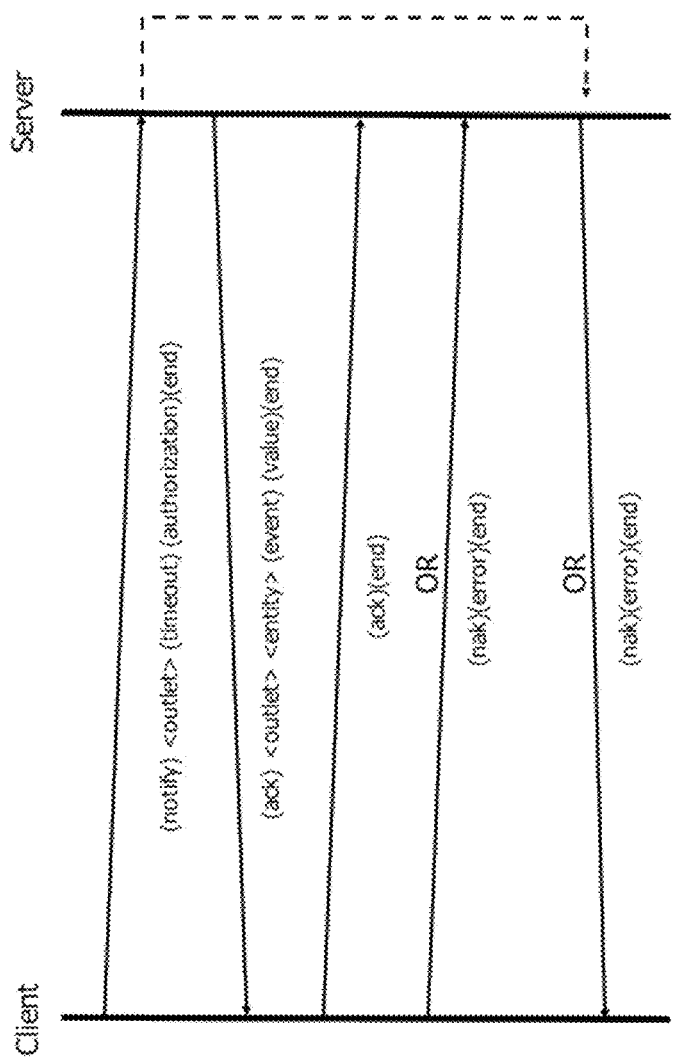
FIG. 24 illustrates the HGTP protocol for the API WAIT operation in accordance with a preferred embodiment.
Figure 25:
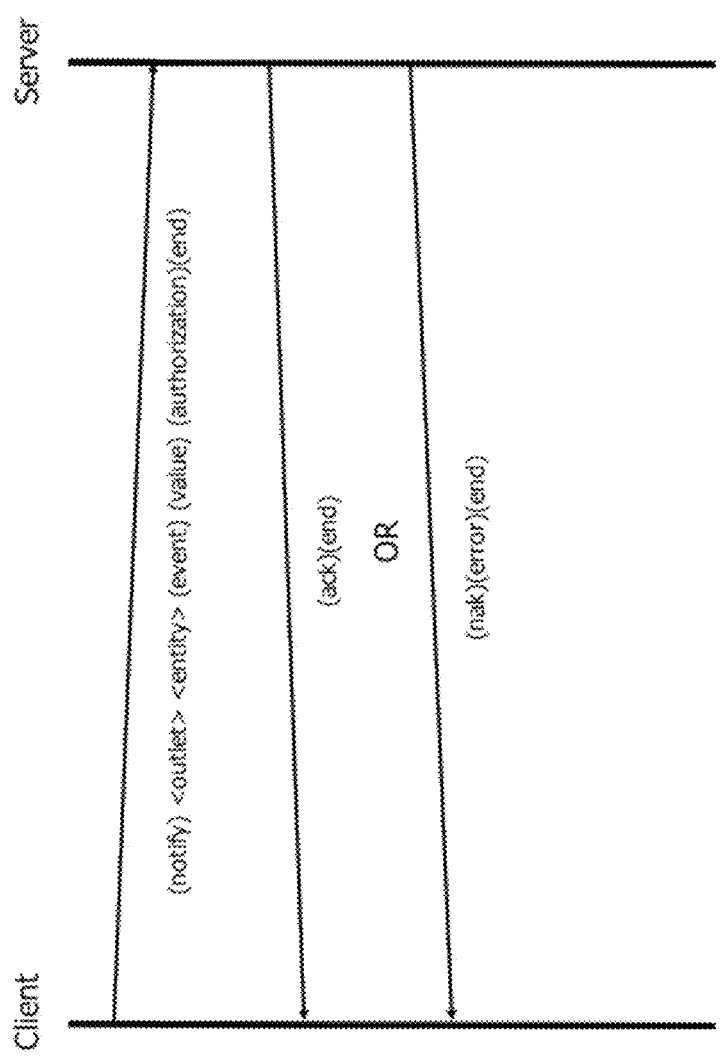
FIG. 25 illustrates the HGTP protocol for the API NOTIFY operation in accordance with a preferred embodiment.
Figure 26:
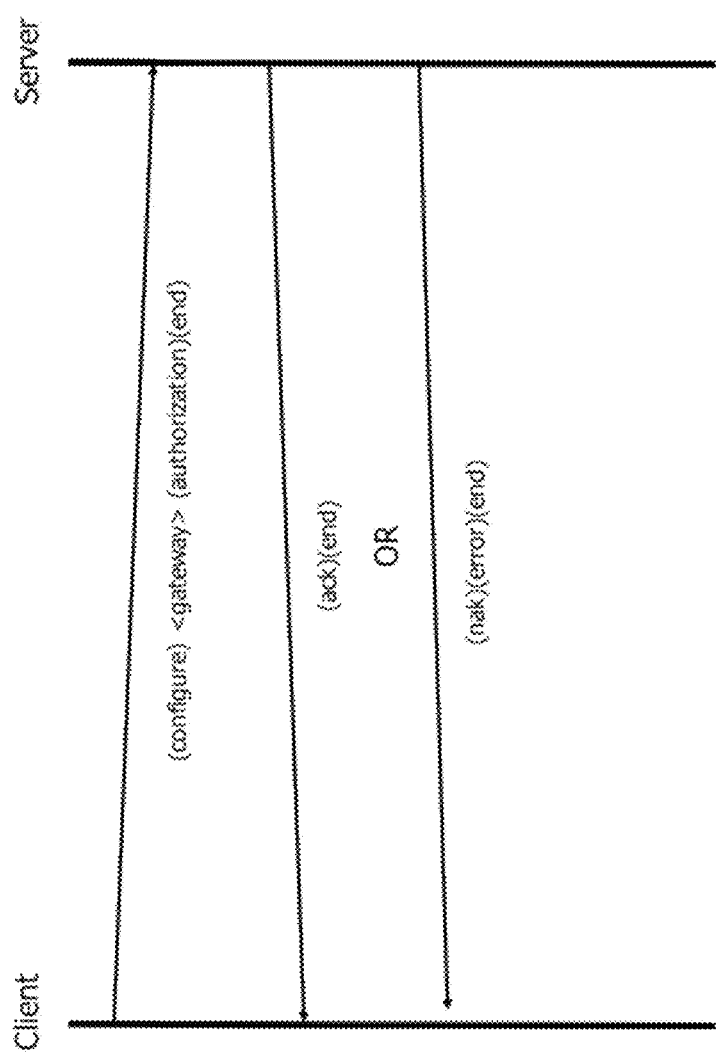
FIG. 26 illustrates the HGTP protocol for the API CONFIGURE operation in accordance with a preferred embodiment.
Figure 27:
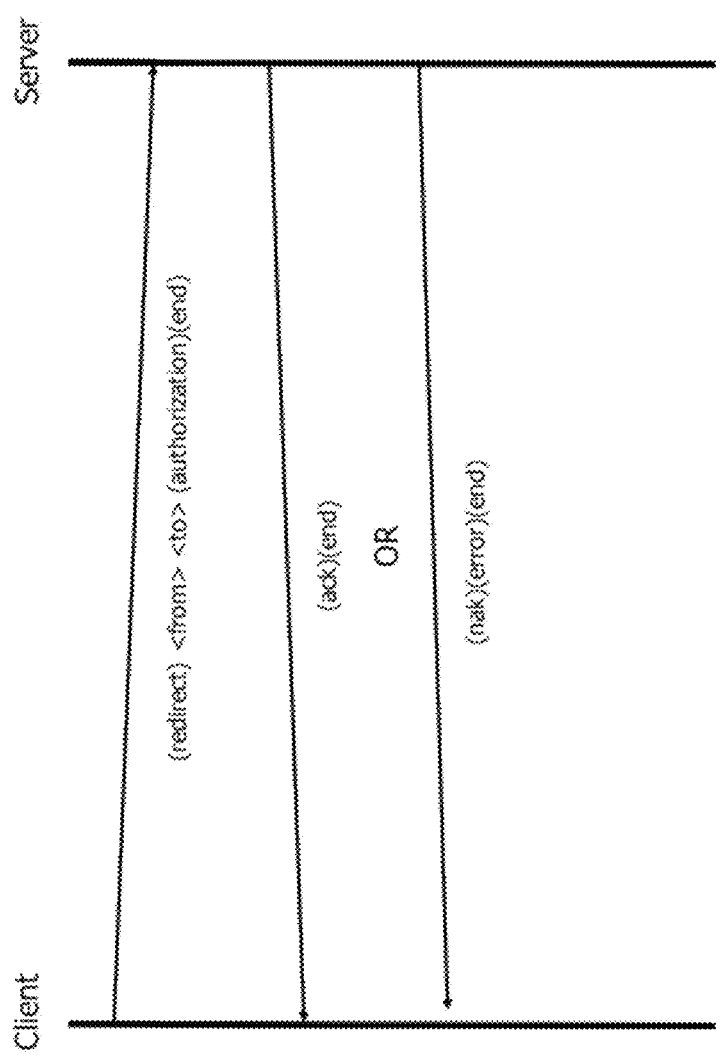
FIG. 27 illustrates the HGTP protocol for the API REDIRECT operation in accordance with a preferred embodiment.
Figure 28B:
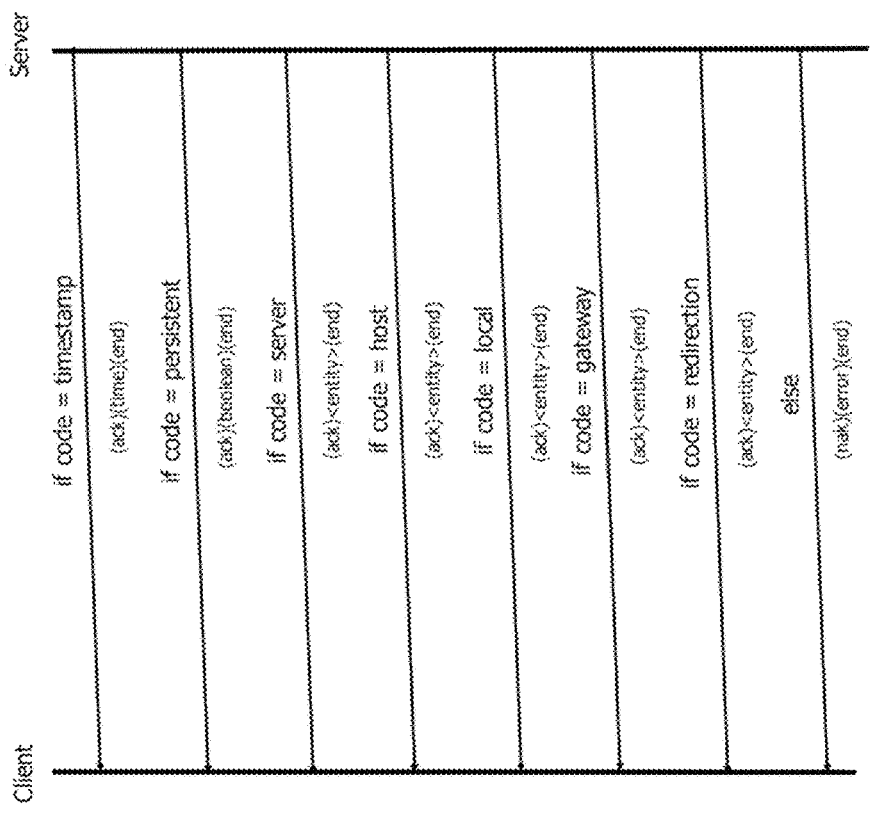
FIGS. 28(a) and 28(b) illustrate the HGTP protocol for the API utility function reporting operation in accordance with a preferred embodiment.
Figure 28A:
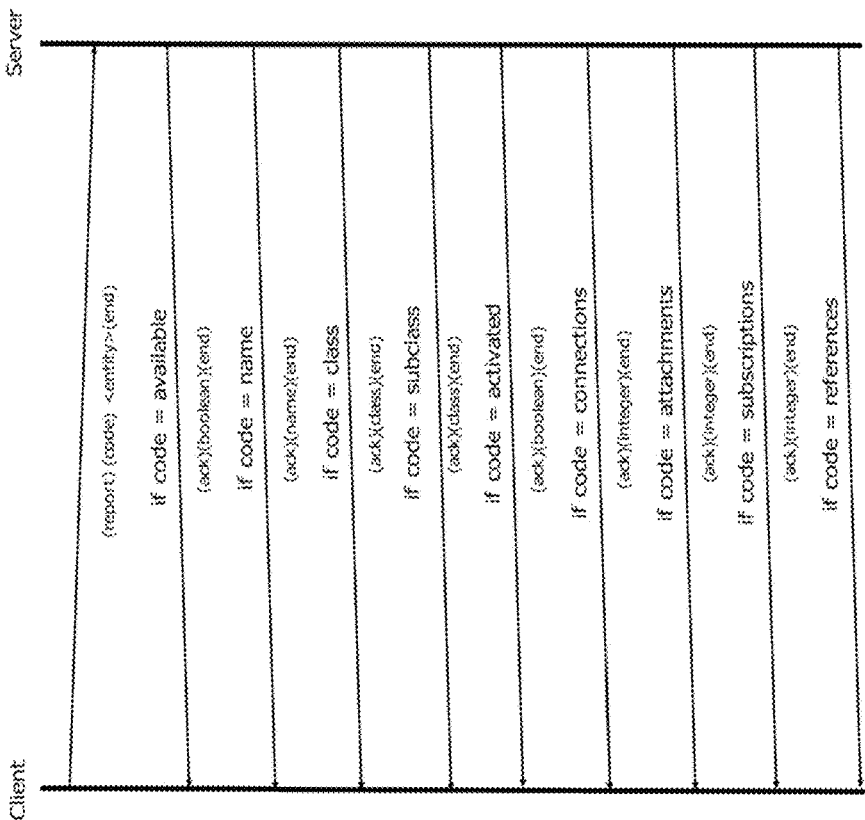
Figure 29:
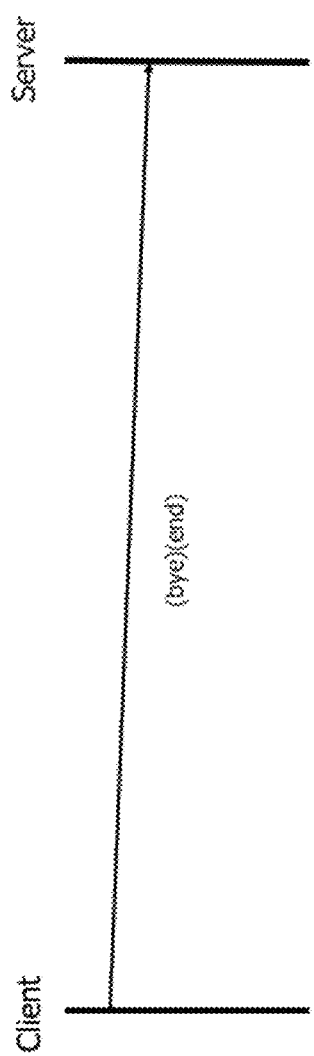
FIG. 29 illustrates the HGTP protocol for the END operation in accordance with a preferred embodiment.

For the API CREATE operation:
entity:=Create(name,class,subclass,persistence,authorization);
the HGTP protocol is shown in FIG. 2.
For the API DELETE operation:
Delete(entity,authorization);
the HGTP protocol is shown in FIG. 3.
For the API INVOKE operation:
result:=Invoke(entity,method,attribute,name,value,parameter, precedence,timeout,authorization);
the HGTP protocol is shown in FIG. 4.
For the API INQUIRE operation:
result:=Inquire(entity,attribute,name,value,parameter,precedence,timeout, authorization);
the HGTP protocol is shown in FIG. 5.
For the API REFERENCE operation:
Reference(entity,authorization);
the HGTP protocol is shown in FIG. 6.
For the API DEREFERENCE operation:
Dereference(entity,authorization);
the HGTP protocol is shown in FIG. 7.
For the API CONNECT operation:
Connect(entity,outlet,method,precedence,authorization);
The HGTP protocol is shown in FIG. 8.
For the API DISCONNECT operation:
Disconnect(entity,outlet,method,precedence,authorization);
The HGTP protocol is shown in FIG. 9.
For the API CONNECTION operation:
Connection(entity,index,outlet,method,precedence,authorization);
The HGTP protocol is shown in FIG. 10.
For the API ATTACH operation:
Attach(entity,outlet,attribute,precedence,authorization);
The HGTP protocol is shown in FIG. 11.
For the API DETACH operation:
Detach(entity,outlet,attribute,precedence,authorization);
The HGTP protocol is shown in FIG. 12.
For the API ATTACHMENT operation:
Attachment(entity,index,outlet,attribute,precedence, authorization);
The HGTP protocol is shown in FIG. 13.
For the API ACTIVATE operation:
Activate(entity,outlet,authorization);
The HGTP protocol is shown in FIG. 14.
For the API DEACTIVATE operation:
Deactivate(entity,outlet,authorization);
The HGTP protocol is shown in FIG. 15.
For the API RESET operation:
Reset(outlet,authorization);
The HGTP protocol is shown in FIG. 16.
For the API ADAPT operation:
Adapt(outlet,Adapter'access,authorization);
The HGTP protocol is shown in FIG. 17.
For the API CALL operation:
Call(outlet,entity,method,attribute,name,value,parameter, precedence,authorization);
The HGTP protocol is shown in FIG. 18.
For the API PUBLISH operation:
Publish(entity,event,value,authorization);
The HGTP protocol is shown in FIG. 19.
For the API SUBSCRIBE operation:
Subscribe(entity,outlet,event,authorization);
The HGTP protocol is shown in FIG. 20.
For the API CANCEL operation:
Cancel(entity,outlet,event,authorization);
The HGTP protocol is shown in FIG. 21.
For the API SUBSCRIPTION operation:
Subscription(entity,index,outlet,event,authorization);
The HGTP protocol is shown in FIG. 22.
For the API CLEAR operation:
Clear(outlet,authorization);
The HGTP protocol is shown in FIG. 23.
For the API WAIT operation:
Wait(outlet,Subscriber'access,timer,authorization);
The HGTP protocol is shown in FIG. 24.
For the API NOTIFY operation:
Notify(outlet,entity,event,value,authorization);
The HGTP protocol is shown in FIG. 25.
For the API CONFIGURE operation:
Configure(gateway, authorization);
The HGTP protocol is shown in FIG. 26.
For the API REDRECT operation:
Redirect(from,to,authorization);
The HGTP protocol is shown in FIG. 27.
For the API utility function reporting, the HGTP protocol is shown in a FIGS. 28(a) and (b).
And for the END operation, the HGTP protocol is shown in FIG. 29.

Each of the message fields identified above and in FIGS. 2 to 29 are described below. Message fields include message parameters, message codes, report codes, response codes, error codes, and termination code.

Table 1 lists the message parameters defined for HGTP:

| Message Field | Parameter |
|---|---|
| <entity> | entity identifier of the form "<P\|H\|U>" where P is a 64-bit unsigned integer for the public (wide-area) network identifier (PID; H is a 64-bit unsigned integer for the private (local area) network identifier (HID; U is a 64-bit unsigned integer for the local unique identifier (UID). |
| <outlet> | entity identifier |
| <gateway> | entity identifier |
| <from> | entity identifier |
| <to> | entity identifier |
| (name) | 16-bit unsigned integer specifying the length of a name string (in bytes), followed by 'space' character followed by the name string, without quotation marks. Example: 12 Hello World! |
| (value) | 16-bit unsigned integer specifying the length of a value string (in bytes), followed by 'space' character followed by the value string, without quotation marks. Example: 12 Hello World! |
| (result) | 16-bit unsigned integer specifying the length of a result string (in bytes), followed by 'space' character followed by the result string, without quotation marks. Example: 12 Hello World! |
| (boolean) | Either ASCII character '0' or '1' |
| (class) | 32-bit unsigned integer specifying an entity class type |
| (subclass) | 32-bit unsigned integer specifying an entity subclass type |
| (method) | 32-bit unsigned integer specifying an entity method |
| (attribute) | 32-bit unsigned integer specifying an entity attribute |
| (event) | 32-bit unsigned integer specifying an entity event |
| (parameter) | 32-bit integer value; may be preceded with '+' or '−' character |
| (precedence) | 32-bit integer value, greater than or equal to 0 |
| (timeout) | 32-bit integer value, greater than or equal to 0 |
| (index) | 32-bit integer value, greater than or equal to 0 |
| (integer) | 32-bit integer value, greater than or equal to 0 |
| (time) | 64-bit UNIX epochtime integer value |
| (authorization) | 64-bit unsigned integer value |
| (code) | Report code (see below) |
| (error) | Error code (see below) |

Each client HGTP message begins with an unsigned integer message code. The message codes are defined for HGTP in Table 2.

TABLE 2

| Message Code | Code Value |
|---|---|
| (bye) | "0" |
| (create) | "1" |
| (delete) | "2" |
| (connect) | "3" |
| (disconnect) | "4" |
| (attach) | "5" |
| (detach) | "6" |
| (invoke) | "7" |
| (inquire) | "8" |
| (call) | "9" |
| (adapt) | "10" |
| (reset) | "11" |
| (connection) | "12" |
| (attachment) | "13" |
| (reference) | "14" |
| (dereference) | "15" |
| (activate) | "16" |
| (deactivate) | "17" |
| (publish) | "18" |
| (subscribe) | "19" |
| (notify) | "20" |
| (cancel) | "21" |
| (subscription) | "22" |
| (wait) | "23" |
| (clear) | "24" |

TABLE 2-continued

| Message Code | Code Value |
|---|---|
| (configure) | "25" |
| (redirect) | "26" |
| (report) | "27" |

Each client HGTP REPORT message includes a report code that identifies the specific report being requested. The report codes for HGTP are defined in Table 3.

TABLE 3

| Report Code | Code Value |
|---|---|
| (null) | "0" |
| (available) | "1" |
| (name) | "2" |
| (class) | "3" |
| (subclass) | "4" |
| (activated) | "5" |
| (connections) | "6" |
| (attachments) | "7" |
| (subscriptions) | "8" |
| (redirection) | "9" |
| (persistence) | "10" |
| (references) | "11" |
| (timestamp) | "12" |
| (server) | "13" |
| (local) | "14" |
| (gateway) | "15" |
| (host) | "16" |

A response message is returned for every HGTP client message request. Each response message begins with a response code. The response codes are defined in Table 4.

TABLE 4

| Response Code | Code Value |
|---|---|
| (ack) | ASCII 'ACK' character (decimal value 6; hex value 6) |
| (nak) | ASCII 'NAK' character (decimal value 21; hex value 15) |

Each unsuccessful HGTP message response includes an error code that identifies the general reason the request failed. The error codes for HGTP are defined in Table 5.

TABLE 5

| Error Code | Code Value |
|---|---|
| (null) | "0" |
| (entity_error) | "1" |
| (outlet_error) | "2" |
| (protocol_error) | "3" |
| (network_error) | "4" |
| (timeout_error) | "5" |
| (authorization_error) | "6" |
| (adapter_error) | "7" |
| (subscriber_error) | "8" |

And Every HGTP message concludes with a null byte termination code, defined for HGTP as: (end):ASCII 'NUL' character (decimal value 0; hex value 0).

Accordingly, the embodiments described herein exemplify both an API and a corresponding protocol for facilitating system component inter-connectivity and communication between components of an innovative system and method for constructing a knowledge model "overlay" for organizing and analyzing large, dynamic data volumes (e.g. the World-Wide Web).

One skilled in the art will recognize variations to the embodiments exemplified herein that are well within the scope of the embodiments.

We claim:

1. A system for connecting one or more client applications running on one or more clients with one or more knowledge representation server entities to access distributed knowledge within a knowledge space, the system comprising:
an application programming interface (API) for providing one or more of creation, access and management of entities within a knowledge space, wherein the knowledge space is shared by all users of the API and access to the knowledge space and creation and management of entities therein is provided by a predetermined set of operations; and
a hypergraph transfer protocol (HGTP), for facilitating communication between the one or more client applications and one or more knowledge representation server entities responsive to a client application request for one or more of creation, access and management of one or more entities within the knowledge space, wherein the client application request includes an initialize session API operation for a specific one or more entities that is received by a first knowledge representation server entity that does not manage the specific entity in the knowledge space, the first knowledge representation server entity forwarding via the HGTP the specific entity call to a second knowledge representation server entity which does manage the specific entity within the knowledge space, the second knowledge representation server entity responding to the received specific entity call whereby upon receipt of the specific one or more entities by the one or more client applications the session is completed by a finalize session API operation; and
further wherein the first and second knowledge representation server entities are non-dynamically bound to specific first and second physical server devices.

2. The system of claim 1, wherein the HGTP is a text-based socket stream protocol communicated between the one or more client applications and one or more knowledge representation servers via Transmission Control Protocol (TCP) or Transport Layer Security (TLS) protocol.

3. The system of claim 1, wherein the specific entity is an item of a knowledge space that is defined by an ontology.

4. The system of claim 3, wherein the HGTP is ontology-agnostic.

5. The system of claim 3, wherein the specific entity is selected from a group consisting of: a person, a place and a thing.

6. The system of claim 5, wherein the specific entity includes one or more attributes.

7. The system of claim 6, wherein the one or more attributes are dynamic.

8. The system of claim 1, wherein the specific entity includes a universal unique identifier (UUID) having encoded therein a network address for the second knowledge representation server entity that manages the specific entity, and
further wherein, the first knowledge representation server entity uses the UUID to forward the specific entity call to the second knowledge representation server entity via the HGTP.

9. The system of claim 8, wherein the UUID consists of 128-bit values with the upper 32 bits designating a globally unique public host identifier, the next 32 bits designating a locally unique local host identifier, and the lower 64 bits designating a locally unique entity identifier.

10. A process for connecting one or more client applications running on one or more clients with one or more knowledge representation server entities to access distributed knowledge within a knowledge space, the system comprising:
issuing by a client application via an application programming interface (API), a request related to a specific entity associated with the knowledge space, wherein the request includes an initialize session API operation;
receiving the request at a first knowledge representation server entity which is non-dynamically bound to a first physical server device;
determining at the first knowledge representation server entity that the specific entity is managed at a second knowledge representation server entity which is non-dynamically bound to a second physical server device;
forwarding the client application request related to the specific entity to the second knowledge representation server entity using a hypergraph transfer protocol (HGTP);
retrieving from the second physical server device data responsive to the client application request and forwarding via a hypergraph transfer protocol (HGTP) a message containing the retrieved data to the first knowledge representation server entity;
receiving at the first knowledge representation server entity, the message responsive to the client application request and providing the responsive data to the client application, wherein to the client application, fulfillment of the request appears to be local; and
ending the session by a finalize session API operation.

11. The process according to claim 10, wherein determining at the first knowledge representation server entity that the specific entity is managed at a second knowledge representation server entity includes review of a specific entity's universal unique identifier (UUID) to determine a network address encoded therein for the second knowledge representation server entity.

12. The system of claim 11, wherein the UUID consists of 128-bit values with the upper 32 bits designating a globally unique public host identifier, the next 32 bits designating a locally unique local host identifier, and the lower 64 bits designating a locally unique entity identifier.

13. The process according to claim 10, wherein the API client application request establishes an open socket to the first knowledge representation server entity for a predetermined period of time.

14. The process according to claim 13, wherein during the predetermined period of time, a second API client application request is made to the first knowledge representation server entity through the open socket.

15. The process according to claim 13, wherein if no additional API client application request is made to the first knowledge representation server entity during the predetermined period of time, the client sends a BYE message to notify the server of a socket shutdown.

16. The process according to claim 13, wherein the predetermined period of time is approximately 1 minute.

17. The process according to claim 10, wherein ending the session includes closing an open socket to the first knowledge representation server entity.

18. The process according to claim 10, wherein determining at the first knowledge representation server entity that the specific entity is managed at a second knowledge representation server entity includes review of a specific enti- 47ty's universal unique identifier (UUID) to determine a network address encoded therein for the second knowledge representation server entity.

19. A process for connecting one or more client applications running on one or more clients with one or more knowledge representation server entities to access distributed knowledge within a knowledge space, the system comprising:

issuing by a client application via an application programming interface (API), a request related to a specific entity associated with the knowledge space, wherein the request includes an initialize session API operation;

receiving the request at a first knowledge representation server entity which is non-dynamically bound to a first physical server device;

confirming client application's authorization to make the request related to the specific entity;

determining at the first knowledge representation server entity that the specific entity is managed at a second knowledge representation server entity which is non-dynamically bound to a second physical server device;

forwarding the client application request related to the specific entity to the second knowledge representation server entity using a hypergraph transfer protocol (HGTP);

retrieving from the second physical server device data responsive to the client application request and forwarding via a hypergraph transfer protocol (HGTP) a message containing the retrieved data to the first knowledge representation server entity;

receiving at the first knowledge representation server entity, the message responsive to the client application request and providing the responsive data to the client application, wherein to the client application, fulfillment of the request appears to be local; and ending the session by a finalize session API operation.

20. The process according to claim 19, wherein ending the session includes closing an open socket to the first knowledge representation server entity.

* * * * *